(12) United States Patent
Cheng et al.

(10) Patent No.: US 11,126,848 B2
(45) Date of Patent: Sep. 21, 2021

(54) INFORMATION PROCESSING DEVICE, INFORMATION PROCESSING METHOD, AND INFORMATION PROCESSING PROGRAM

(71) Applicant: Rakuten Group, Inc., Tokyo (JP)

(72) Inventors: Kelvin Ka Sin Cheng, Tokyo (JP); Soh Masuko, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/615,901

(22) PCT Filed: Nov. 20, 2017

(86) PCT No.: PCT/JP2017/041676
§ 371 (c)(1),
(2) Date: Nov. 22, 2019

(87) PCT Pub. No.: WO2019/097726
PCT Pub. Date: May 23, 2019

(65) Prior Publication Data
US 2020/0184218 A1 Jun. 11, 2020

(51) Int. Cl.
*G06K 9/00* (2006.01)
*G06F 1/16* (2006.01)

(52) U.S. Cl.
CPC .......... *G06K 9/00671* (2013.01); *G06F 1/163* (2013.01)

(58) Field of Classification Search
None
See application file for complete search history.

(56) References Cited

U.S. PATENT DOCUMENTS

| | | | |
|---|---|---|---|
| 6,738,804 B1 * | 5/2004 | Lo ........................ | G06F 16/9577 |
| | | | 709/219 |
| 9,280,849 B2 * | 3/2016 | Adhikari ............ | G06Q 30/0623 |
| 2011/0141011 A1 | 6/2011 | Lashina et al. | |

(Continued)

FOREIGN PATENT DOCUMENTS

| | | | |
|---|---|---|---|
| JP | 2013211027 A | 10/2013 | |
| JP | 2016173693 A | 9/2016 | |

(Continued)

OTHER PUBLICATIONS

International Preliminary Report on Patentability with the translation of Written Opinion dated Jun. 4, 2020, from the International Bureau in International application No. PCT/JP2017/041676.

(Continued)

*Primary Examiner* — David H Chu
(74) *Attorney, Agent, or Firm* — Sughrue Mion, PLLC

(57) ABSTRACT

An information processing device according to one embodiment includes a detection unit that detects an attention region corresponding to a user's sense of sight, an identification unit that identifies a first object overlapping the attention region from one or more objects existing in a space where the user is located, a request unit that makes a request for first object information related to the first object to another computer during a first time period where the first object overlaps the attention region, and a receiving unit that receives the first object information transmitted from the another computer in response to the request during the first time period.

19 Claims, 15 Drawing Sheets

(56) References Cited

U.S. PATENT DOCUMENTS

| | | | | |
|---|---|---|---|---|
| 2011/0254861 A1* | 10/2011 | Emura | ............... | H04N 5/23216 |
| | | | | 345/633 |
| 2013/0050258 A1 | 2/2013 | Liu et al. | | |
| 2013/0191250 A1* | 7/2013 | Bradley | ............. | G06Q 30/0623 |
| | | | | 705/26.61 |
| 2016/0247324 A1* | 8/2016 | Mullins | ............. | G02B 27/0179 |
| 2016/0274358 A1* | 9/2016 | Yajima | ............... | G02B 27/0093 |
| 2017/0041597 A1* | 2/2017 | Sugaya | ................... | G06F 3/011 |

FOREIGN PATENT DOCUMENTS

| | | |
|---|---|---|
| JP | 2017033334 A | 2/2017 |
| WO | 2017/031089 A1 | 2/2017 |

OTHER PUBLICATIONS

International Search Report dated Dec. 19, 2017, in International Application No. PCT/JP2017/041676.

\* cited by examiner

INFORMATION PROCESSING DEVICE, INFORMATION PROCESSING METHOD, AND INFORMATION PROCESSING PROGRAM

CROSS REFERENCE TO RELATED APPLICATIONS

This application is a National Stage of International Application No. PCT/JP2017/041676, filed Nov. 20, 2017.

TECHNICAL FIELD

One aspect of the present invention relates to an information processing device, an information processing method, and an information processing program that provide a user with augmented reality.

BACKGROUND ART

An information processing device is known that identifies an object at the end of a user's line of sight and provides the user with information related to this object as augmented reality. For example, Patent Literature 1 discloses a head-mounted display including an imaging means that detects a user's line of sight by taking an image of the user's eyes and an interest data output means that identifies an object displayed as three-dimensional data based on the detected user's line of sight and outputs the object as interest target data.

CITATION LIST

Patent Literature

PTL1: JP 2017-33334 A

SUMMARY OF INVENTION

Technical Problem

There is a possibility that it takes a long time for an information processing device worn by a user to acquire, from a server, related information of all objects within the user's field of view. In addition, even when this terminal acquires the related information successfully, if the user's view has changed during this processing, the related information of objects that have gone out of the field of view is discarded without being displayed on the terminal. Therefore, data communication between the information processing device and the server results in waste.

In view of the foregoing, it is desirable to efficiently perform data communication of an information processing device that provides a user with augmented reality.

Solution to Problem

An information processing device according to one aspect of the present invention includes a detection unit configured to detect an attention region corresponding to a user's sense of sight, an identification unit configured to identify a first object overlapping the attention region from one or more objects existing in a space where the user is located, a request unit configured to make a request for first object information related to the first object to another computer during a first time period where the first object overlaps the attention region, and a receiving unit configured to receive the first object information transmitted from the another computer in response to the request during the first time period.

An information processing method according to one aspect of the present invention is an information processing method performed by an information processing device including a processor, the method including a detection step of detecting an attention region corresponding to a user's sense of sight, an identifying step of identifying a first object overlapping the attention region from one or more objects existing in a space where the user is located, a request step of making a request for first object information related to the first object to another computer during a first time period where the first object overlaps the attention region, and a receiving step of receiving the first object information transmitted from the another computer in response to the request during the first time period.

An information processing program according to one aspect of the present invention causes a computer to execute a detection step of detecting an attention region corresponding to a user's sense of sight, an identifying step of identifying a first object overlapping the attention region from one or more objects existing in a space where the user is located, a request step of making a request for first object information related to the first object to another computer during a first time period where the first object overlaps the attention region, and a receiving step of receiving the first object information transmitted from the another computer in response to the request during the first time period.

In the above-described aspects, during the first time period where an object overlaps the attention region, request and reception of the first object information related to this object are performed. Because a user is likely to be paying attention to this object during this first time period, information of the first object that is provided through a communication network is useful to a user and does not result in waste. In this manner, by requesting and receiving information during a time period where a user is likely to be paying attention to an object, it is possible to efficiently perform data communication of the information processing device.

Advantageous Effects of Invention

According to one aspect of the present invention, it is possible to efficiently perform data communication of an information processing device that provides a user with augmented reality.

DESCRIPTION OF EMBODIMENTS

An embodiment of the present invention is described hereinafter with reference to the attached drawings. Note that, in the description of the drawings, the same elements are denoted by the same reference symbols and redundant description thereof is omitted.

[System Configuration] In this embodiment, an information processing device according to the present invention is applied to a head-mounted display (HMD) 10. The HMD 10 is a display device to be worn on a user's head, and it is one type of a wearable terminal. The HMD 10 is worn to cover both eyes of a user, and the user can see information displayed on the HMD 10. In this embodiment, the HMD 10 is used to provide a user with augmented reality. The augmented reality is a world where computer-processed information is added to the real world. Thus, a display type of the HMD 10 is a transmissive type such as optical see-through or video see-through. A user is a person who wears the HMD 10 and experiences the augmented reality.

Figure 1:
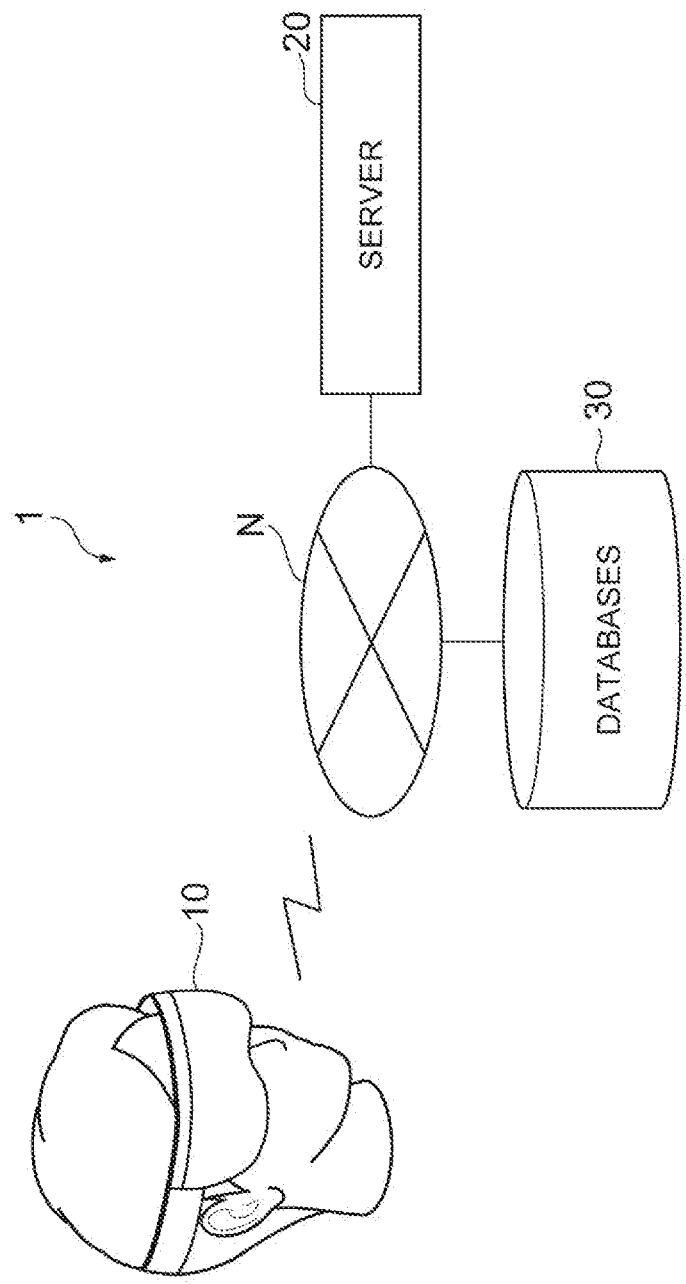
FIG. 1 is a view showing an example of the overall configuration of an augmented reality (AR) system.

FIG. 1 is a view showing an example of the overall configuration of an augmented reality (AR) system 1 including the HMD 10. The AR system 1 is a computer system that provides a user of the HMD 10 with augmented reality. The AR system 1 includes a server 20 and databases 30 in addition to the HMD 10. Although one HMD 10 is shown in FIG. 1, the number of HMDs 10 included in the AR system 1 is not limited, and the AR system 1 may include a plurality of HMDs 10. The HMD 10 and the server 20 can transmit and receive data to and from each other through a communication network N. The server 20 can access the databases 30 through the communication network N. The server 20 is a computer that provides the HMD 10 with information for implementing the augmented reality, and it corresponds to "another computer" from the standpoint of the HMD 10. The databases 30 are devices that store data needed to provide the augmented reality. The configuration of the communication network N is not limited, and it may include the Internet, an intranet or the like. A part of the communication network N that connects to the HMD 10 is generally a wireless communication network.

Figure 2:
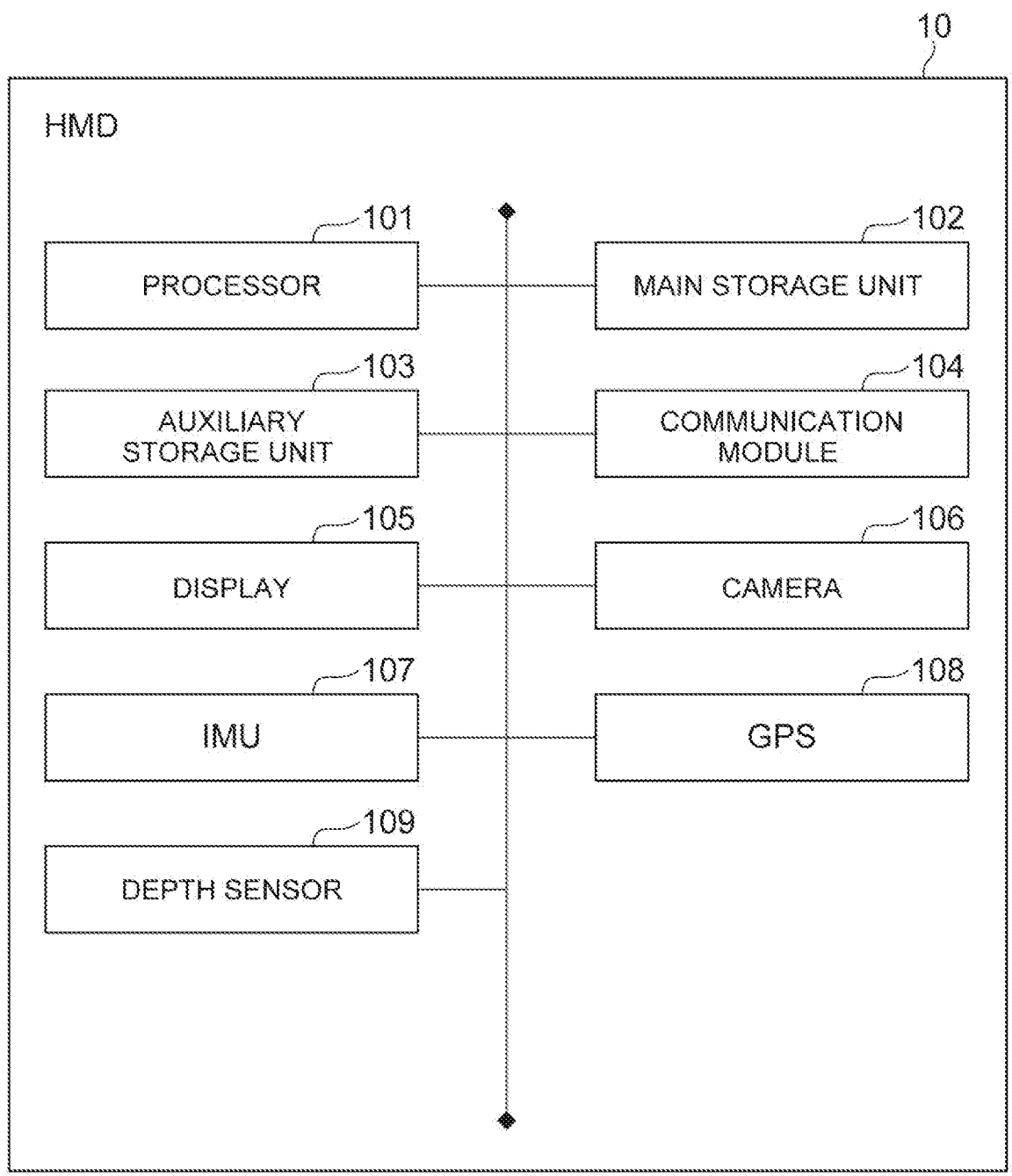
FIG. 2 is a view showing an example of the hardware configuration of a head-mounted display (HMD) according to an embodiment.

FIG. 2 is a view showing an example of the hardware configuration of the HMD 10. For example, the HMD 10 includes a processor 101, a main storage unit 102, an auxiliary storage unit 103, a communication module 104, a display 105, a camera 106, an inertial measurement unit (IMU) 107, a global positioning system (GPS) 108, and a depth sensor 109. The processor 101 is an arithmetical unit that executes an operating system, an application program and the like. The main storage unit 102 consists of ROM and RAM, and temporarily stores a loaded program, an operation result and the like. The auxiliary storage unit 103 consists of a flash memory or the like, and permanently stores a program or data. The communication module 104 consists of a wireless communication module or the like, and transmits and receives data to and from another computer. The display 105 is a device that displays data or information in a way visible to a user, and it displays an image for a left eye and an image for a right eye and thereby achieves stereoscopic vision. The camera 106 is a sensor for photographing a user's surrounding environment or photographing a user's eyes, and the HMD 10 may be equipped with a plurality of types of cameras for each purpose of such photographing. The IMU 107 is a sensor that detects the triaxial angle or angular velocity and acceleration that define the movement. The GPS 108 is a system that calculates the current location by using radio waves emitted from a plurality of artificial satellites. The depth sensor 109 is a sensor that measures the distance to an object, and it is an infrared depth sensor, for example. The HMD 10 may not include some of those hardware elements or may include other hardware elements. The shape of the HMD 10 may be a glasses style, a goggle style, a helmet style or the like, though the shape is not limited thereto.

The functional elements of the HMD 10 are implemented by loading given software (for example, a client program P1, which is described later) onto the processor 101 or the main storage unit 102 and running this software. The processor 101 makes the communication module 104, the display 105, the camera 106, the IMU 107, the GPS 108 or the depth sensor 109 operate in accordance with the software, and reads and writes data to and from the main storage unit 102 or the auxiliary storage unit 103. Data or databases required for the processing are stored in the main storage unit 102 or the auxiliary storage unit 103.

Figure 3:
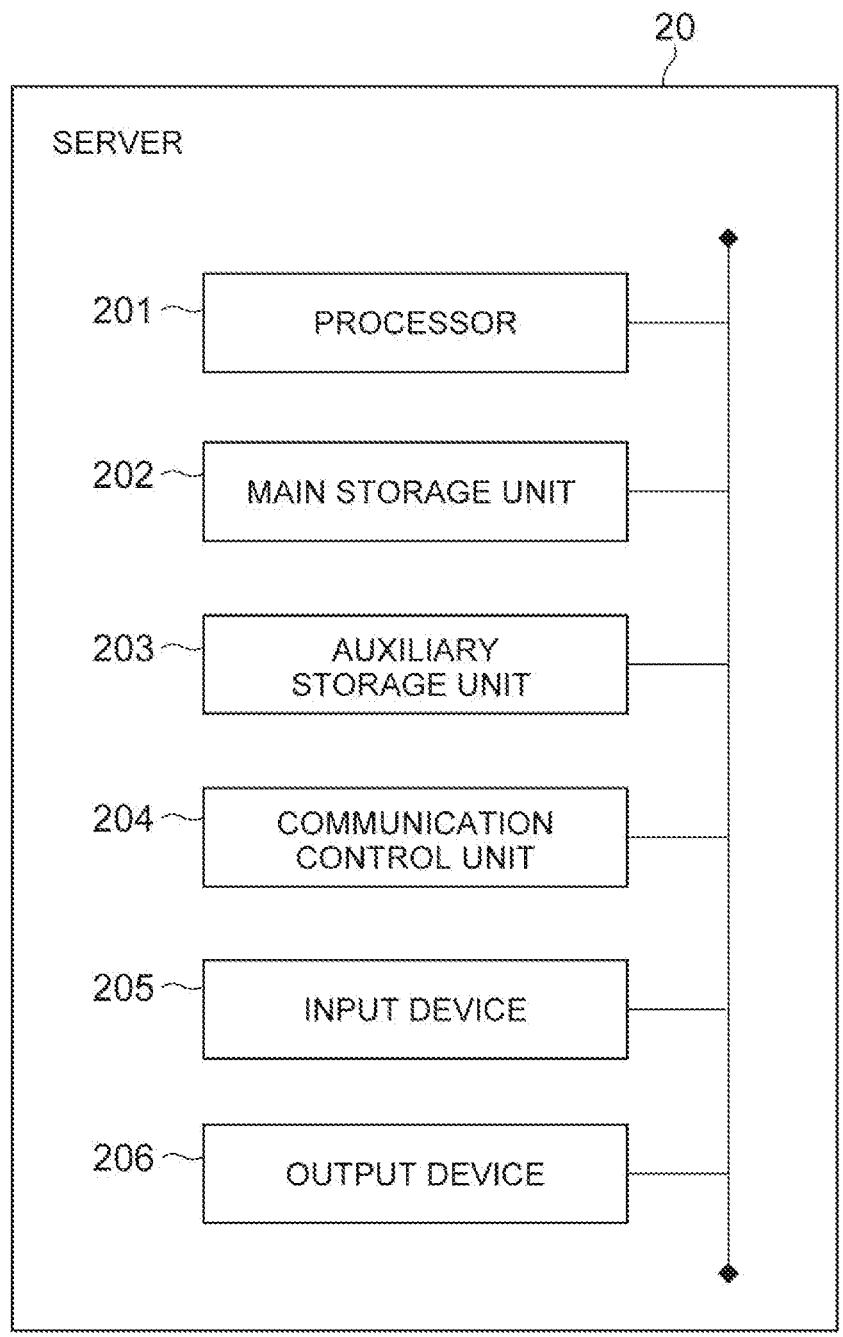
FIG. 3 is a view showing an example of the hardware configuration of a server according to the embodiment.

FIG. 3 is a view showing an example of the hardware configuration of the server 20. The server 20 includes a processor 201 that executes an operating system, an application program and the like, a main storage unit 202 such as ROM and RAM, an auxiliary storage unit 203 such as a hard disk or a flash memory, a communication control unit 204 such as a network card or a wireless communication module, an input device 205 such as a keyboard and a mouse, and an output device 206 such as a monitor. The server 20 may not include some of those hardware elements or may include other hardware elements.

The functional elements of the server 20 are implemented by loading given software (for example, a server program P2, which is described later) onto the processor 201 or the main storage unit 202 and running this software. The processor 201 makes the communication control unit 204, the input device 205 or the output device 206 operate in accordance with the software, and reads and writes data to and from the main storage unit 202 or the auxiliary storage unit 203. Data or databases required for the processing are stored in the main storage unit 202 or the auxiliary storage unit 203.

The server 20 may be composed of a single computer or a plurality of computers. In the case of using a plurality of computers, those computers are connected through a communication network such as the Internet or an intranet, and thereby one server 20 is logically constructed.

Figure 4:
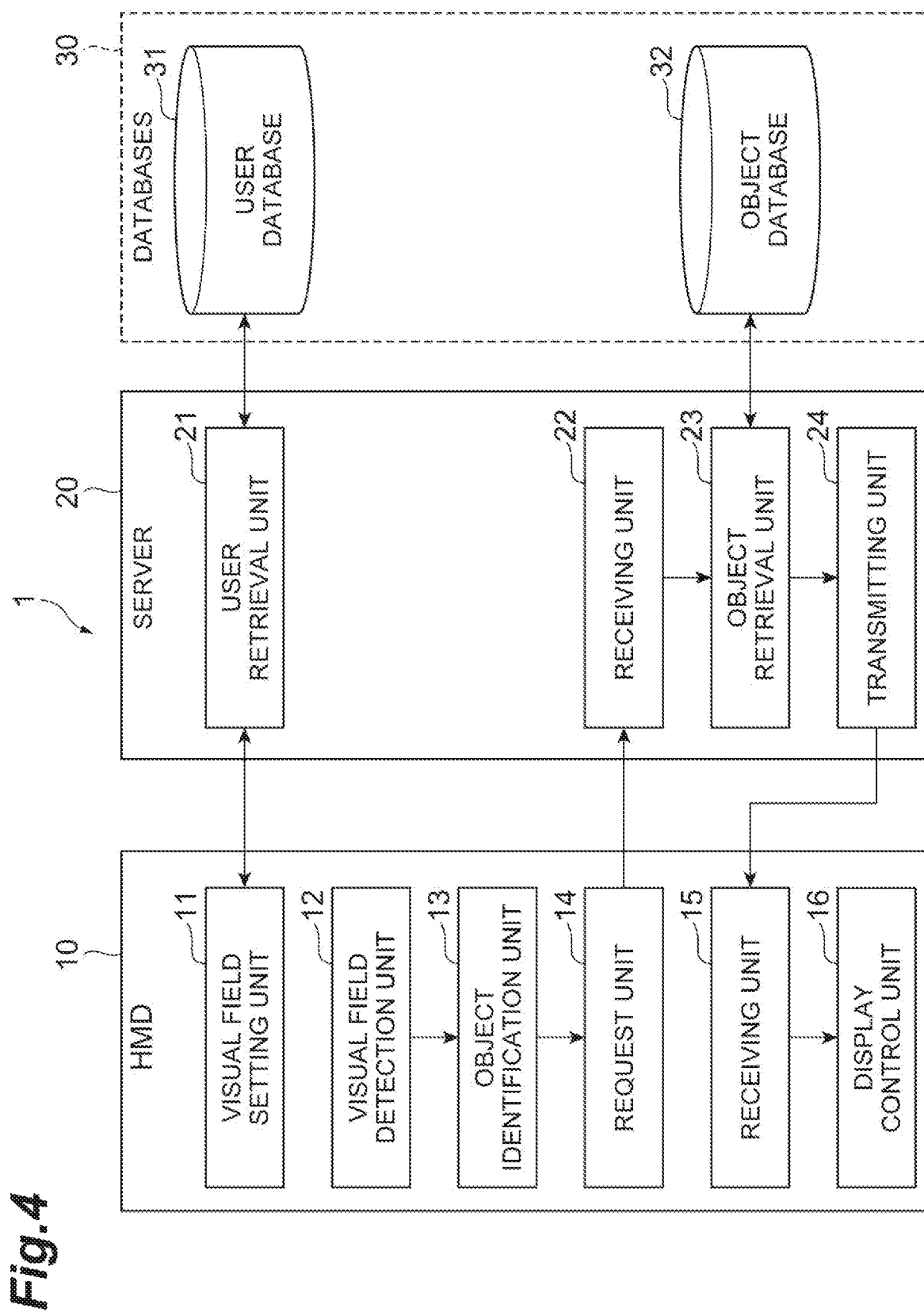
FIG. 4 is a view showing an example of the functional configuration of the AR system according to the embodiment.

FIG. 4 is a view showing an example of the functional configuration of the AR system 1. The HMD 10 includes a visual field setting unit 11, a visual field detection unit 12, an object identification unit 13, a request unit 14, a receiving unit 15, and a display control unit 16 as functional elements. In other words, the processor 101 functions as the visual field setting unit 11, the visual field detection unit 12, the object identification unit 13, the request unit 14, the receiving unit 15, and the display control unit 16. The server 20 includes a user retrieval unit 21, a receiving unit 22, an object retrieval unit 23, and a transmitting unit 24 as functional elements. That is, the processor 201 functions as the user retrieval unit 21, the receiving unit 22, the object retrieval unit 23, and the transmitting unit 24.

The overview of each functional element of the HMD 10 is described hereinafter. The visual field setting unit 11 is a functional element that sets a user's visual field on the HMD 10. To be specific, the visual field setting unit 11 sets a plurality of types of visual fields in accordance with viewing angles. For example, the visual field setting unit 11 sets a range (angle) from a user's point of regard (a point which a user is looking at) and thereby sets the central vision, the effective visual field and the peripheral visual field of this user. The visual field setting unit 11 may acquire a user attribute from the server 20 in order to set the visual field.

Figure 5:
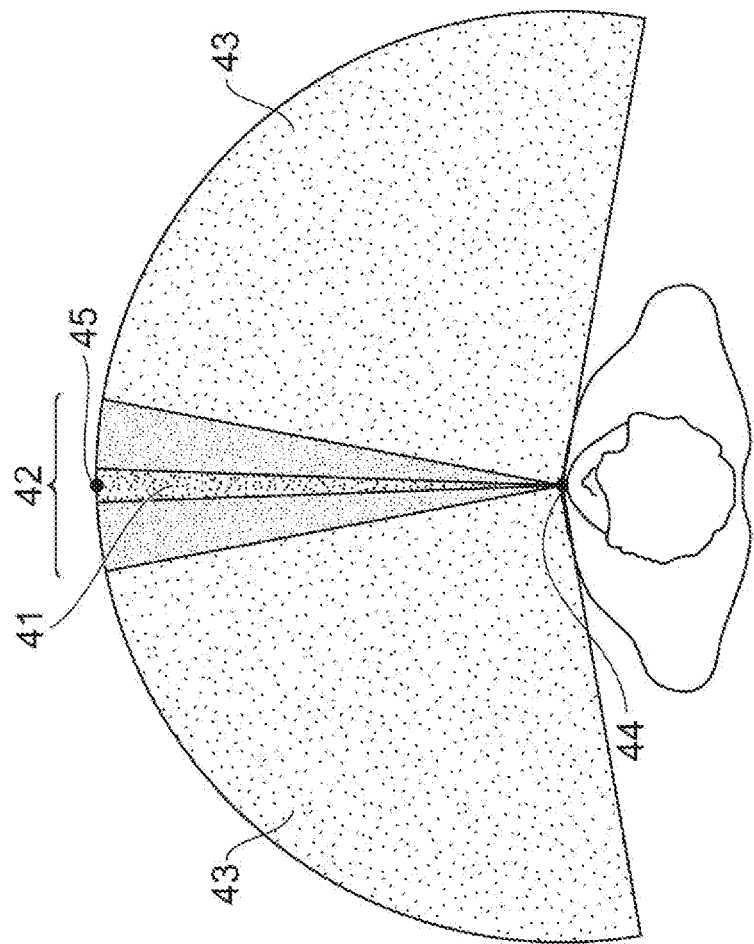
FIG. 5 is a view showing an example of a human's field of view.

The central vision is a region where human can clearly recognize an attribute (e.g., shape and color) of an object, and it is an extremely limited range within 1° to 2° from the point of regard (a position which a user is looking at (or paying attention to)), in general. The effective visual field is a region of the central vision and its surrounding, where human can substantially clearly recognize the attribute of an object, and it is normally in a range of 4° to 20° from the point of regard. The peripheral visual field is a region other than the central vision and the effective visual field (in other words, a region outside the effective visual field), and human cannot clearly recognize an object in this peripheral visual field. Regarding the peripheral visual field, there are characteristics that human can comparatively easily recognize a moving object or a noticeable object but cannot recognize a still object or an unnoticeable object. The central vision, the effective visual field and the peripheral visual field vary among different individuals depending on age or the like. FIG. 5 is a view showing human visual field. A central vision 41, an effective visual field 42 and a peripheral visual field 43 are defined based on a point of view 44 and a point of regard 45. The point of view 44 is a position as a starting point of a line of sight, and an intermediate point between a user's both eyes is set as the point of view, for example. Although the visual field is shown two-dimensionally (a range along the horizontal direction) in this figure, the visual field is defined in the same manner also in the vertical direction, and therefore it is actually defined three-dimensionally.

The visual field detection unit 12 is a functional element that detects an attention region and a peripheral region corresponding to a user's sense of sight. The attention region is a region where a user clearly recognizes an object, in the user's visual field on the HMD 10, and it is a limited region containing the point of regard. The peripheral region is a region other than the attention region in the user's visual field on the HMD 10. The visual field detection unit 12 may detect the attention region containing the central vision and, for example, it may detect only the central vision as the attention region, or may detect a region composed of the central vision and a part or the whole of the effective visual field as the attention region. In any case, the attention region does not contain the peripheral visual field. The visual field detection unit 12 identifies a part other than the attention region as the peripheral region. "The attention region and the peripheral region corresponding to a user's sense of sight" are the attention region and the peripheral region that are set based on the user's current line of sight. Thus, the attention region and the peripheral region to be detected vary depending on the user's position, orientation and movement.

The object identification unit 13 is a functional element that identifies a first object overlapping the detected attention region and a second object overlapping the detected peripheral region from the objects existing in a space where a user is located. The "space where a user is located" is a concept including at least one of a real space where the user is located and a virtual space provided to the user by the HMD 10. Thus, the "object existing in a space where a user is located" is a concept including both of a real object existing in the real space and a virtual object displayed on the display 105 of the HMD 10. The object is a tangible entity visible to a user or a visualized non-tangible entity. The "first object overlapping the attention region" is an object overlapping at least part of the attention region on the display 105 which a user views. The "second object overlapping the peripheral region" is an object overlapping the peripheral region without overlapping the attention region on the display 105 which a user views. The object identification unit 13 can identify one or more first objects and one or more second objects.

The request unit 14 is a functional element that makes a request for object information related to an object to the server 20. The request unit 14 generates a request signal, which is a signal for requesting the object information, and transmits this request signal to the server 20. In this embodiment, there are two types of object information: first object information related to the first object and second object information related to the second object. The first object information and the second object information are displayed (i.e., visualized) on the HMD 10. Data items and contents of the object information are not particularly limited.

The receiving unit 15 is a functional element that receives the first object information or the second object information transmitted from the server 20 in response to a request from the request unit 14. The received object information can be said as a response signal to the request signal.

The display control unit 16 is a functional element that displays the received first object information or second object information on the display 105. The display control unit 16 displays each piece of object information on the HMD 10 in association with each real or virtual object already viewed by a user.

The overview of each functional element of the server 20 is described hereinafter. The user retrieval unit 21 is a functional element that transmits a user attribute in response to a request from the visual field setting unit 11. The receiving unit 22 is a functional element that receives a request signal transmitted from the request unit 14. The object retrieval unit 23 is a functional element that retrieves object information based on this request signal. The transmitting unit 24 is a functional element that transmits this object information to the HMD 10.

The databases 30 are a set of one or more databases. The database is a functional element (storage unit) that stores a set of data so as to respond to a given data operation (e.g., extraction, addition, deletion, overwriting etc.) from a processor or an external computer. The database may be implemented in any way, and it may be a database management system or a text file such as a configuration file, for example. In this embodiment, the databases 30 include a user database 31 and an object database 32.

The user database 31 is a device that stores user information. The user information is information containing a data item indicating a user's attribute. The user attribute is the user's disposition or characteristics, which can contain personal information. Each record of the user information is identified by a user ID, which is an identifier to uniquely identify each user. Any information may be used as the user ID as long as it can identify a user, and a simple serial number or a personal account may be used as the user ID, for example. The user attribute is represented by one or more data items, and the number and type of the data items are not particularly limited. For example, the user attribute may contain data items such as a name, a date of birth (age), a gender, an address, a telephone number and an email address.

The object database 32 is a device that stores object information. The object information is information containing a data item indicating an attribute (disposition or characteristics) of an object. Each record of the object information is identified by an object ID, which is an identifier to uniquely identify each object. Any information may be used as the object ID as long as it can identify an object, and a simple serial number, a product number or a model number may be used as the object ID, for example. The object attribute is represented by one or more data items, and the number and type of the data items are not particularly limited. For example, the object attribute may contain data items such as a product name, a manufacturer name, a vendor name (store name), a sales price, an item description and user's evaluation or comments.

Figure 6:
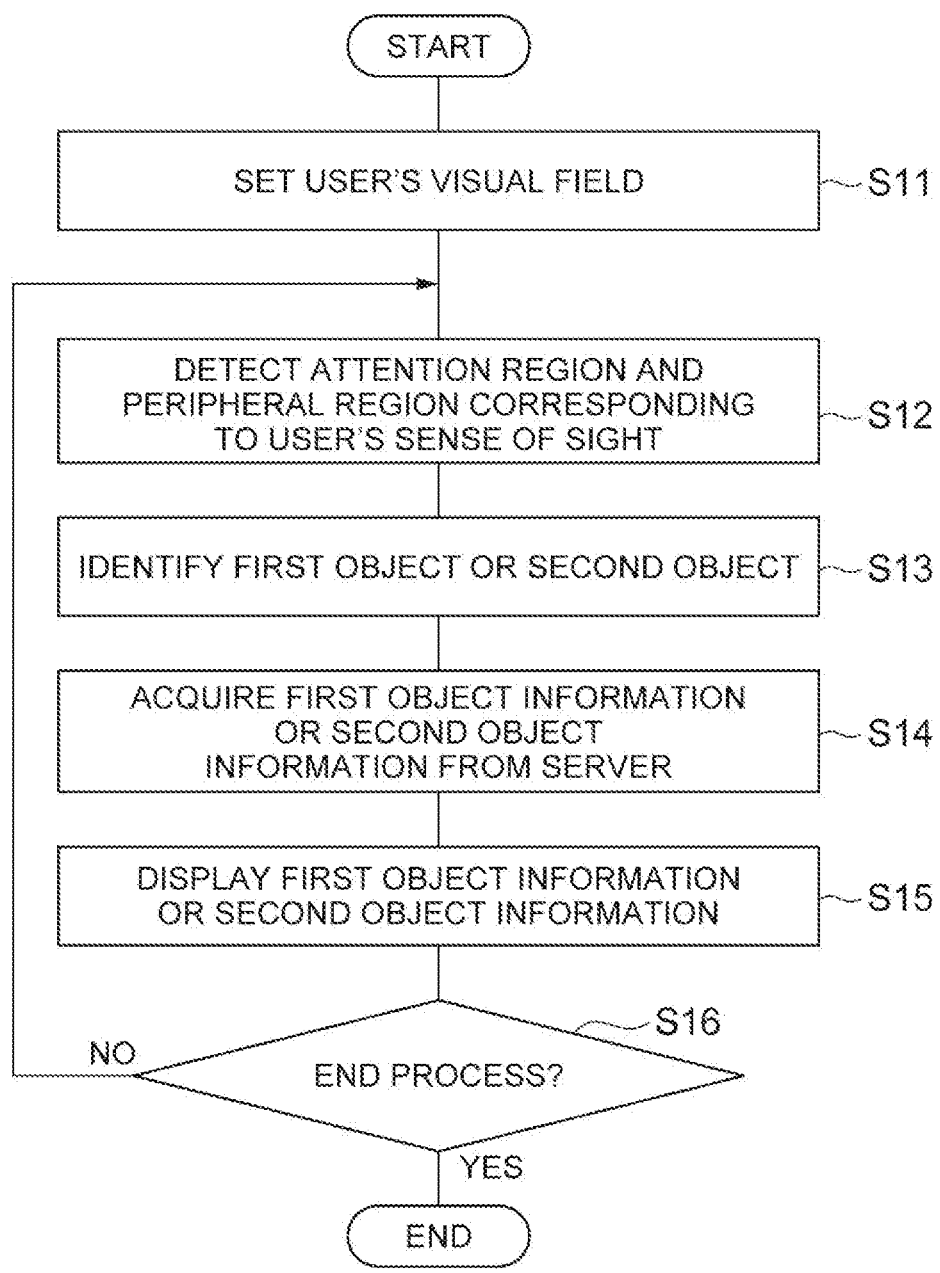
FIG. 6 is a flowchart showing an example of an overall process in the HMD according to the embodiment.
Figure 7:
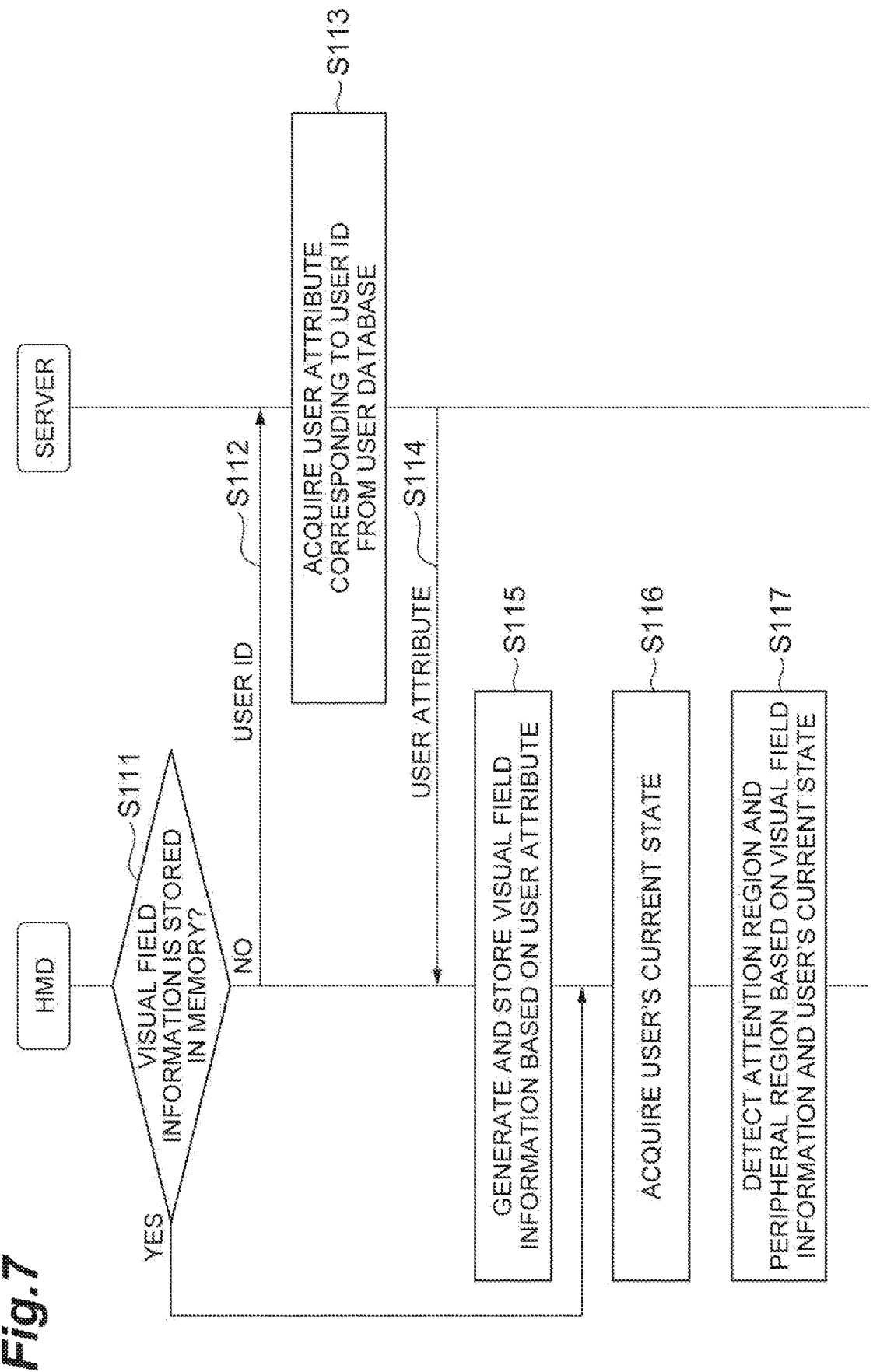
FIG. 7 is a flowchart showing an example of detection of an attention region and a peripheral region in the MD.
Figure 8:
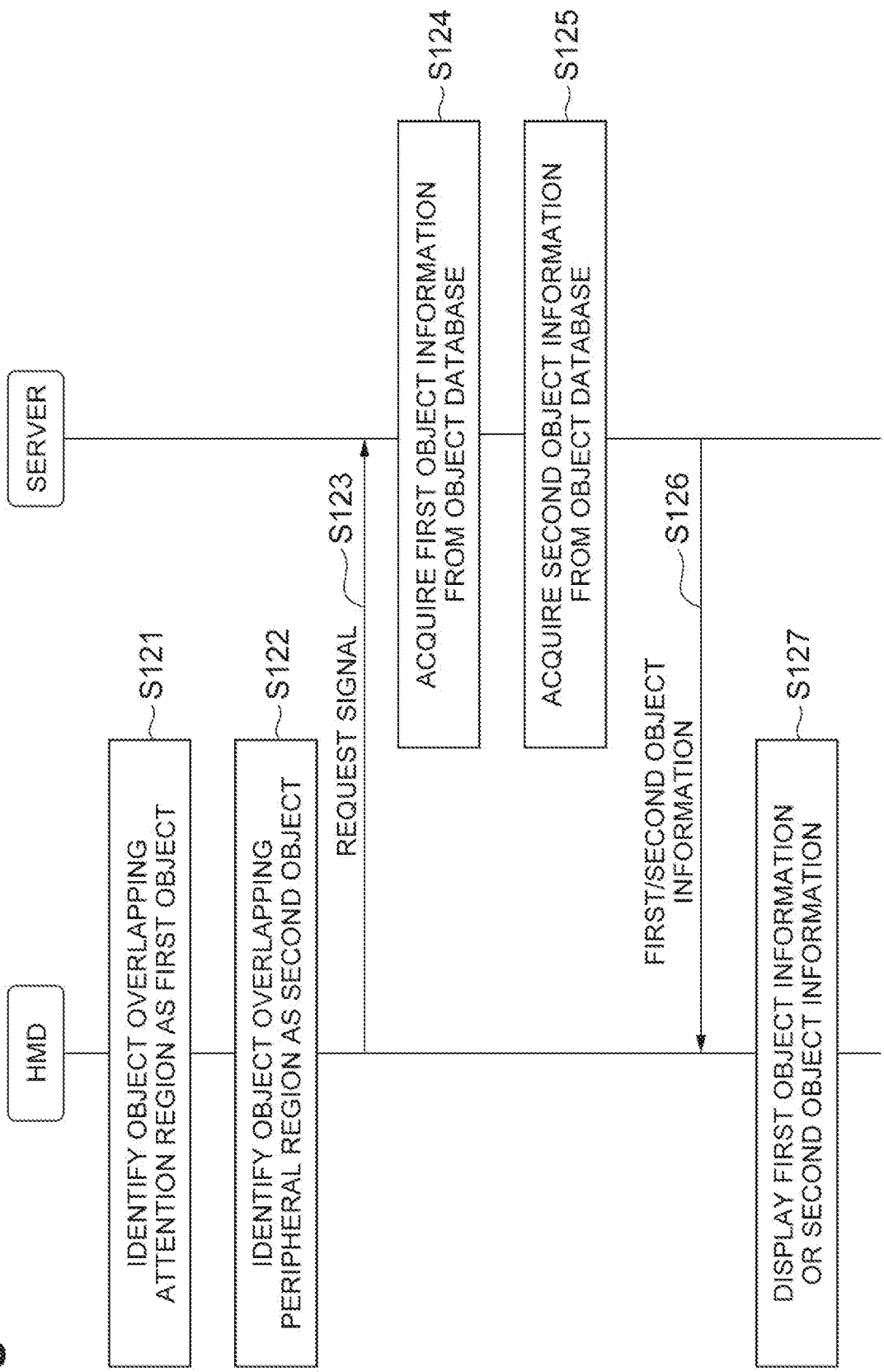
FIG. 8 is a sequence chart showing an example of cooperation between the HMD and the server in relation to acquisition of object information.
Figure 9:
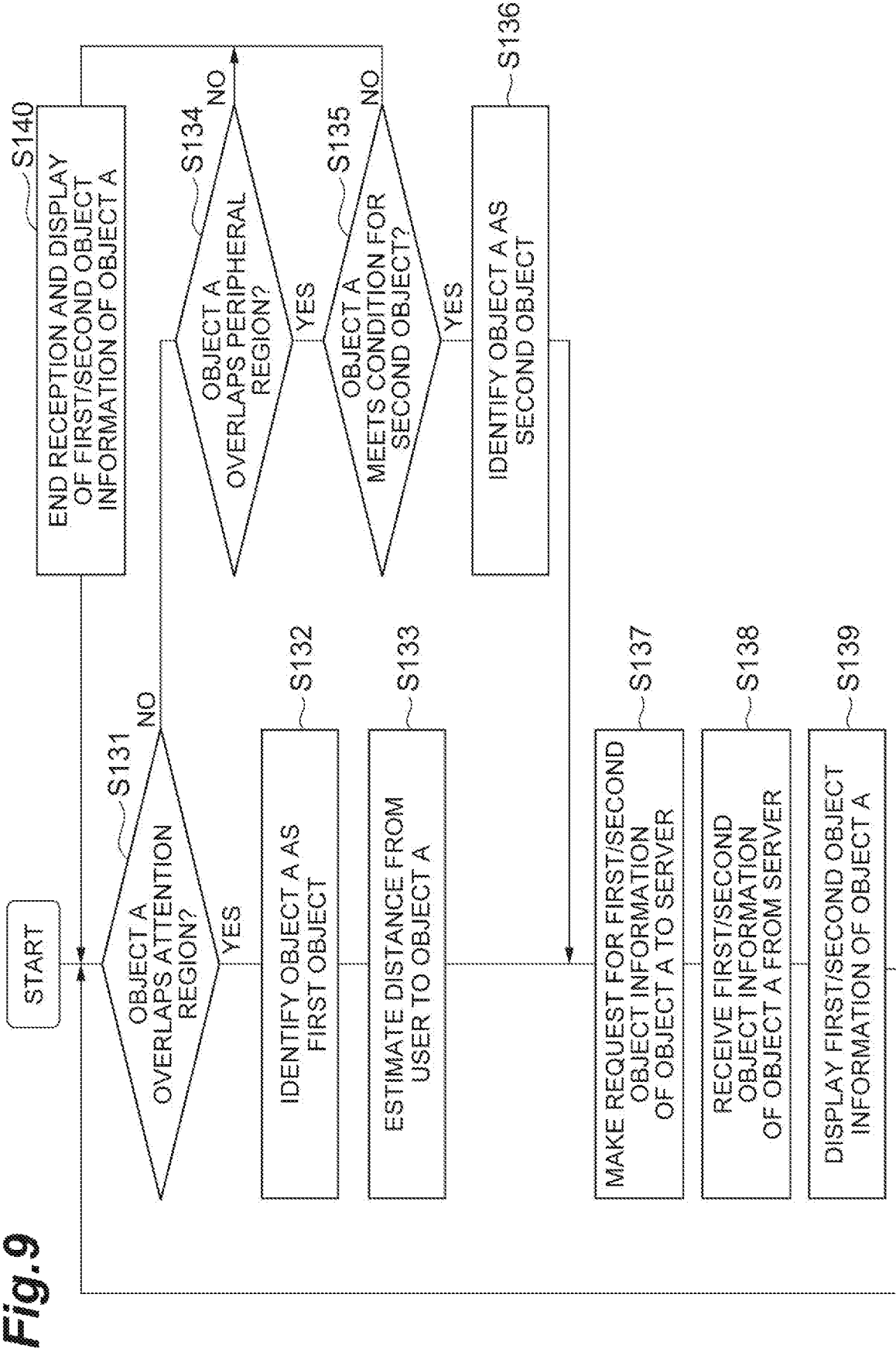
FIG. 9 is a flowchart showing an example of acquisition of object information for one object.
Figure 10:
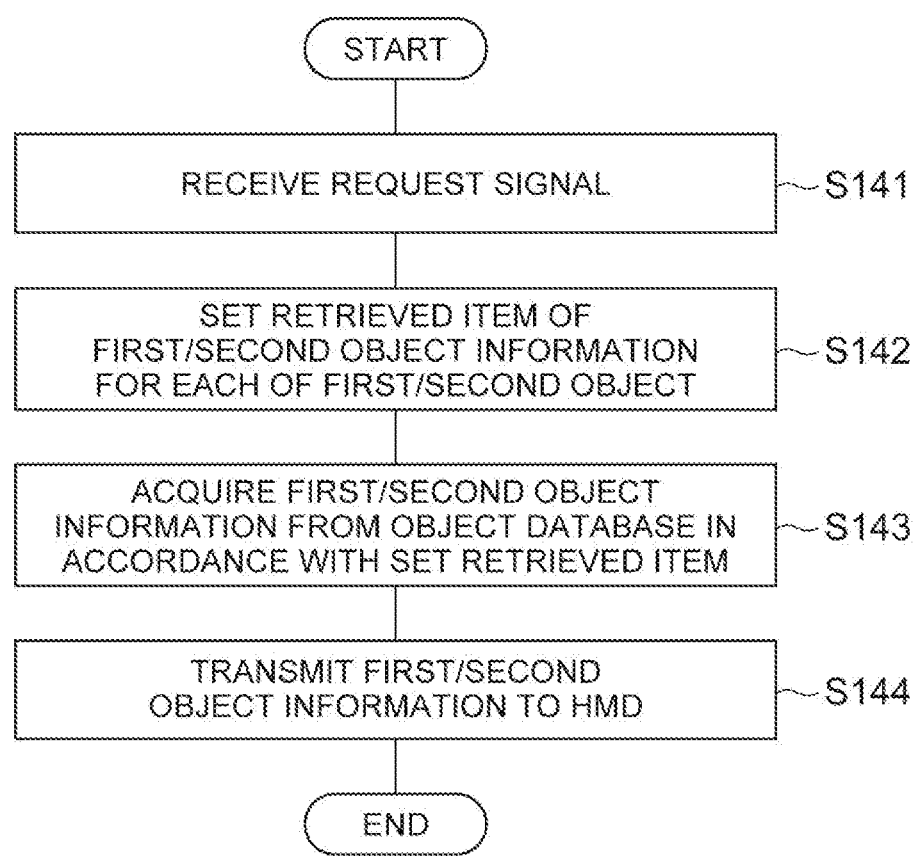
FIG. 10 is a flowchart showing an example of object retrieval in the server according to the embodiment.
Figure 11:
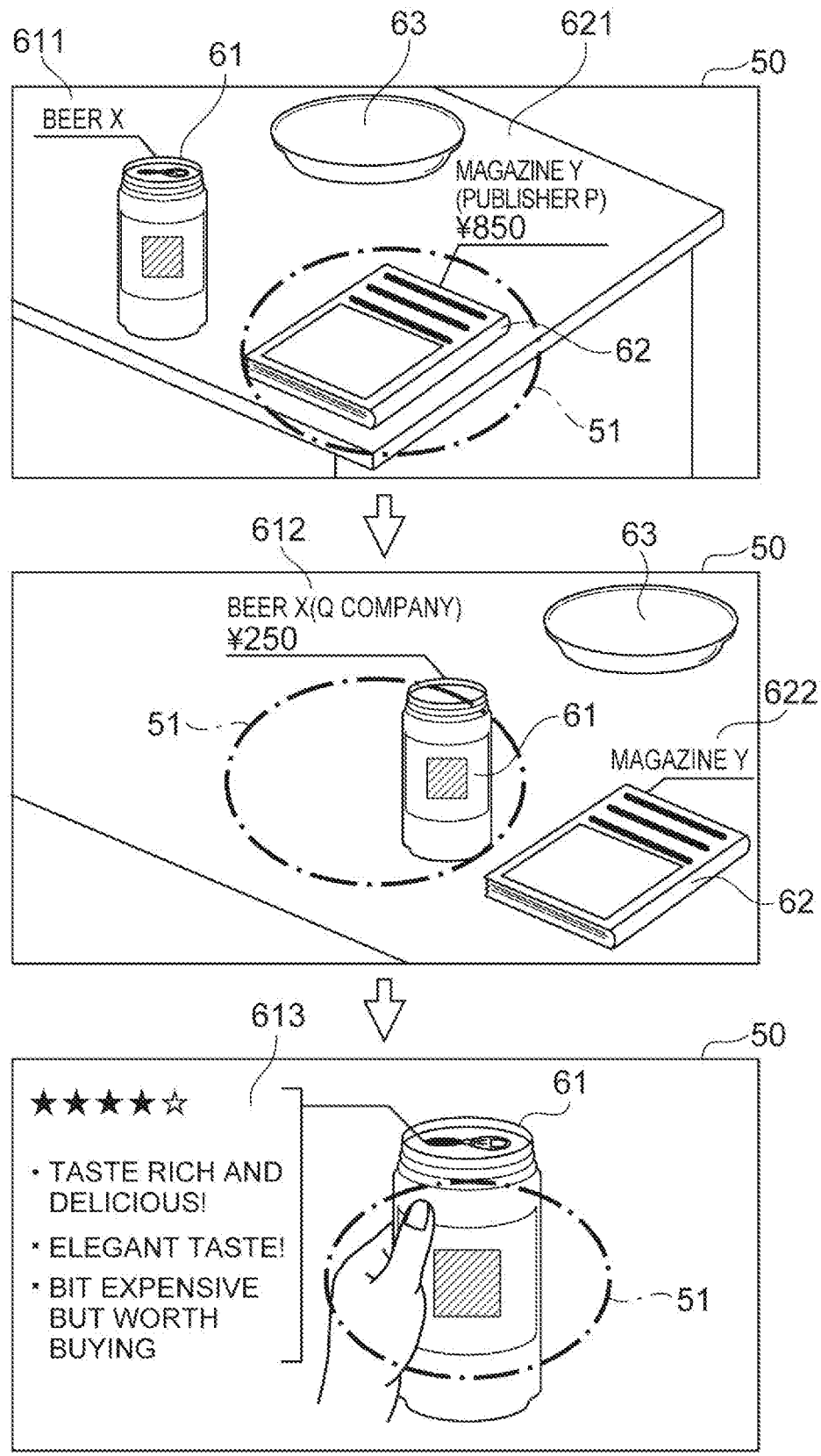
FIG. 11 is a view showing an example of display of object information.
Figure 12:
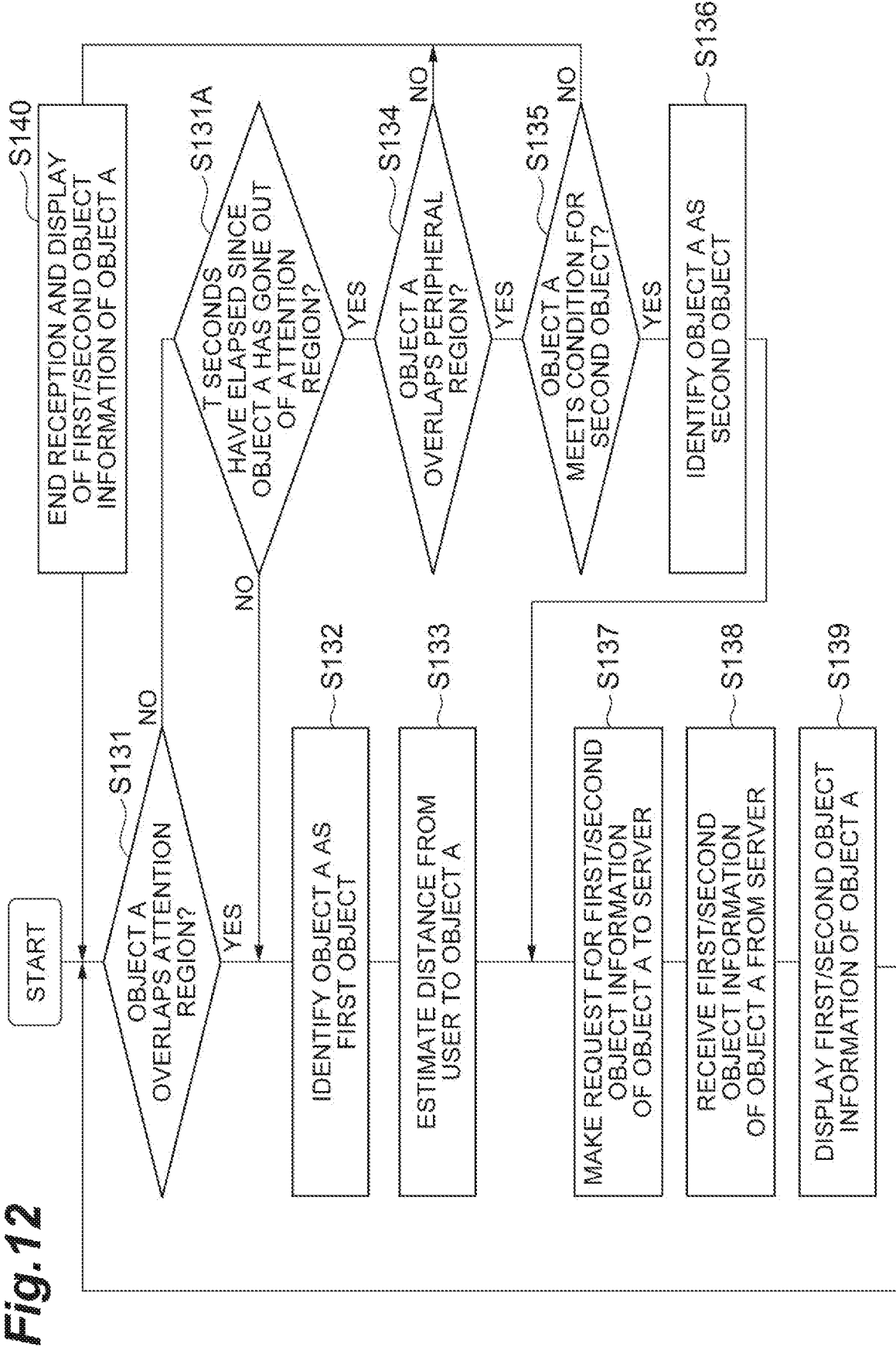
FIG. 12 is a flowchart showing another example of acquisition of object information for one object.
Figure 13:
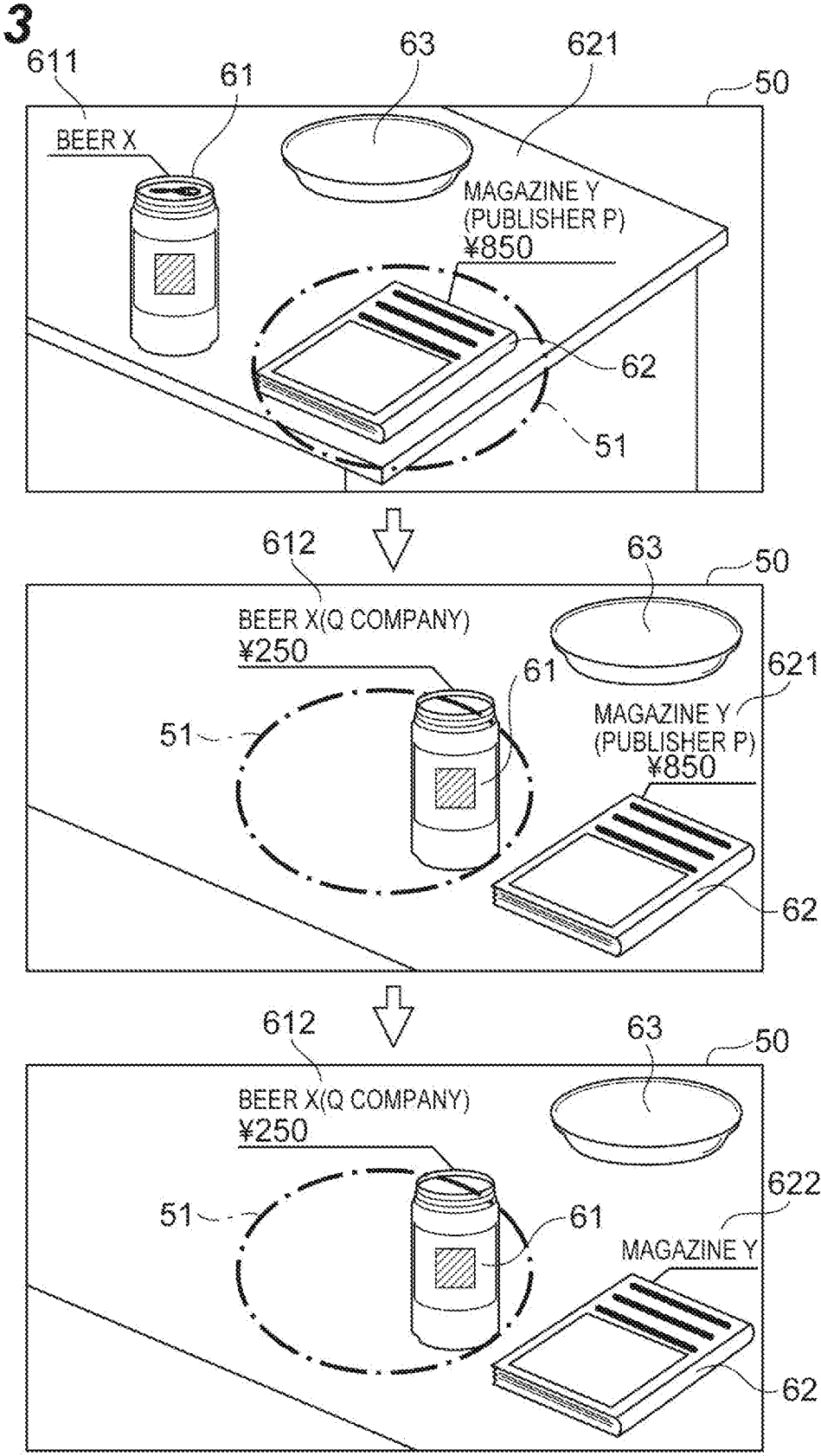
FIG. 13 is a view showing another example of display of object information.
Figure 14:
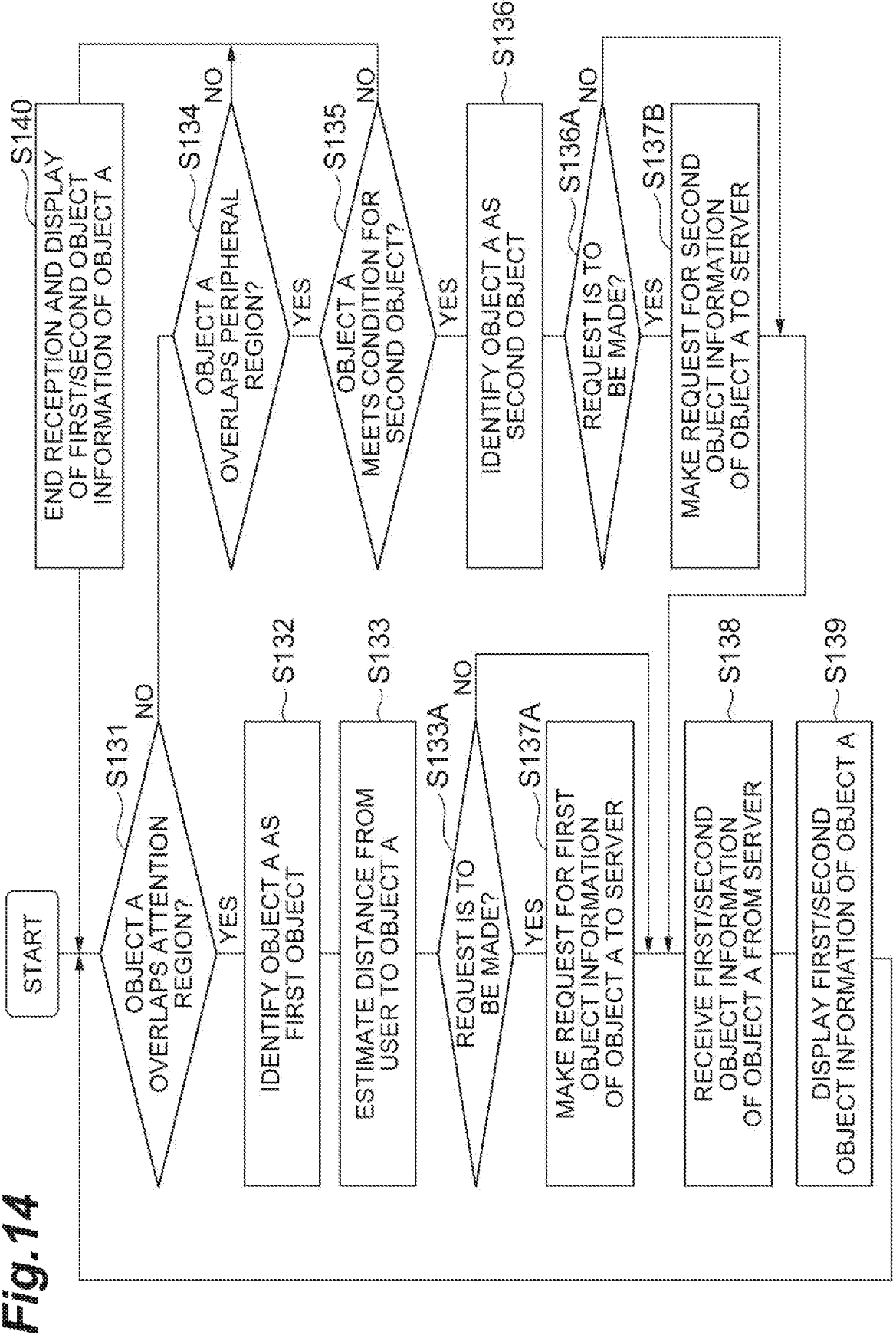
FIG. 14 is a flowchart showing another example of acquisition of object information for one object.

[System Operation] The operation of the AR system 1 and an information processing method according to this embodiment are described hereinafter with reference to FIGS. 6 to 14. FIG. 6 is a flowchart showing an example of an overall process in the HMD 10. FIG. 7 is a flowchart showing an example of detection of an attention region and a peripheral region in the HMD 10. FIG. 8 is a sequence chart showing an example of cooperation between the HMD 10 and the server 20 in relation to acquisition of object information. FIG. 9 is a flowchart showing an example of acquisition of object information for one object. FIG. 10 is a flowchart showing an example of object retrieval in the server 20. FIG. 11 is a view showing an example of display of object information. FIG. 12 is a flowchart showing another example of acquisition of object information for one object. FIG. 13 is a view showing another example of display of object information. FIG. 14 is a flowchart showing another example of acquisition of object information for one object.

The overview of a process in the HMD 10 is described hereinafter with reference to FIG. 6. In Step S11, the visual field setting unit 11 sets a user's visual field. The visual field setting unit 11 may set the central vision, the effective visual field and the peripheral visual field based on the user's attribute or may use the central vision, the effective visual field and the peripheral visual field that have been set in advance regardless of the user's attribute. The visual field setting unit 11 may have an adjustment function to change the values of the central vision, the effective visual field and the peripheral visual field based on user input.

In Step S12, the visual field detection unit 12 detects the attention region and the peripheral region corresponding to the user's sense of sight. The visual field detection unit 12 detects the current attention region and peripheral region based on the visual field set by the visual field setting unit 11 and the user's current state. The detection of the attention region and the peripheral region is processing that identifies the ranges of the attention region and the peripheral region on the HMD 10. The user's current state can be identified based on the user's posture and the presence or absence of movement.

In Step S13, the object identification unit 13 identifies the first object or the second object. The object identification unit 13 identifies the first object by examining an overlap between the detected attention region and an object existing in the space where the user is located (to be specific, an object in the user's visual field through the display 105). Further, the object identification unit 13 identifies the second object by examining an overlap between the detected peripheral region and an object existing in the space where the user is located.

In Step S14, the request unit 14 and the receiving unit acquire the first object information or the second object information from the server 20 in cooperation with each other.

In Step S15, the display control unit 16 displays the first object or the second object on the display 105. The display control unit 16 may display the object information in any format, and it may display the object information in a format such as text, symbol, graphic, still image or moving image, for example. The display control unit 16 may display each piece of object information in close proximity to a corresponding object, thereby showing the relationship between the object and its information to the user in a visually understandable manner.

As shown in Step S16, processing of Steps S12 to S15 is repeated until the end of processing is indicated by user input or the like.

An example of detection of the attention region and the peripheral region is described hereinafter in detail with reference to FIG. 7. In Step S111, the visual field setting unit 11 refers to the memory (the main storage unit 102 or the auxiliary storage unit 103) and checks whether visual field information is already stored or not. The visual field information is information indicating the central vision, the effective visual field and the peripheral visual field when a user remains still. Because the human visual field vary among different individuals as described earlier, it is possible to accurately identify the first object and the second object by setting the visual field on the HMD 10 in accordance with each user.

When the visual field information is not yet stored in the memory of the HMD 10 (No in Step S111), the visual field setting unit 11 transmits a signal containing the user ID to the server 20 in Step S112.

In Step S113, the user retrieval unit 21 of the server 20 receives this signal and searches the user database 31 with the user ID, and thereby acquires the user attribute corresponding to this user ID. In Step S114, the user retrieval unit 21 transmits this user attribute as a response signal to the HMD 10.

In Step S115, the visual field setting unit 11 receives this response signal and generates the visual field information based on the user attribute. The visual field setting unit 11 previously stores a setting rule for determining the central vision, the effective visual field and the peripheral visual field from the user attribute, and sets the central vision, the effective visual field and the peripheral visual field corresponding to the user attribute by referring to this rule. In an example, the setting rule may indicate the correspondence between biological information (e.g., age) and a size (angle from the point of regard) of each of the central vision, the effective visual field and the peripheral visual field. For example, the setting rule may contain the correspondence that, when the age is less than 65, the effective visual field is within a range of up to 20° from the point of regard, and the peripheral visual field is within a range of up to 100° from the point of regard. This setting rule may further contain the correspondence that, when the age is equal to or more than 65, the effective visual field is within a range of up to 10° from the point of regard, and the peripheral visual field is within a range of up to 90° from the point of regard. The details of the setting rule are not limited thereto, and it may be defined using different thresholds and set values or may be defined using a user attribute other than age, for example. In any case, the visual field setting unit 11 sets the user's visual field (the central vision, the effective visual field and the peripheral visual field) based on the user attribute and the setting rule, and generates the visual field information indicating this visual field. The visual field setting unit 11 then stores this visual field information into the memory (the main storage unit 102 or the auxiliary storage unit 103) and uses the visual field information in subsequent processing.

On the other hand, when the visual field information is already stored in the memory (Yes in Step S111), the visual field setting unit 11 reads this visual field information from the memory.

In Step S116, the visual field detection unit 12 acquires the user's current state. For example, the visual field setting unit 11 obtains the user's line of sight (the point of view and the point of regard) by performing a tracking function such as line-of-sight tracking and position tracking by using data obtained from the camera 106 or the IMU 107. Further, the visual field setting unit 11 obtains the user's current moving speed by using data obtained from the camera 106, the IMU 107 or the GPS 108.

In Step S117, the visual field detection unit 12 detects the attention region and the peripheral region based on the visual field information and the user's current state. To be specific, the visual field detection unit 12 calculates the current attention region and peripheral region when the user remains still based on the visual field (the central vision, the effective visual field and the peripheral visual field) indicated by the visual field information and the calculated line of sight (the point of view and the point of regard). Then, the visual field detection unit 12 adjusts those regions based on the calculated moving speed. In general, the human visual field is narrower as he/she moves faster and, for example, the visual field of a driver is narrower as the velocity of a vehicle is higher. The adjustment of the attention region and the peripheral region based on the moving speed is processing that takes such a general phenomenon into account. The visual field detection unit 12 previously stores an adjustment rule for adjusting the attention region and the peripheral region based on the moving speed, and adjusts the attention region and the peripheral region by referring to this rule. The adjustment rule may indicate the correspondence between the moving speed and a size (angle from the point of regard) of each of the attention region and the peripheral region. For example, the adjustment rule may be defined not to adjust the attention region and the peripheral region (i.e., use the attention region and the peripheral region in the still state) when the moving speed is less than Va, and to narrow the attention region and the peripheral region in accordance with an increase in the moving speed when the moving speed is equal to or more than Va.

Processing (Steps S116 and S117) by the visual field detection unit 12 is repeated in accordance with a change in the user's state (to be specific, a change in the user's posture and moving speed).

An example of cooperation between the HMD 10 and the server 20 in relation to acquisition of the object information is described hereinafter in detail with reference to FIG. 8. In Step S121, the object identification unit 13 identifies an object overlapping the attention region as the first object. The object identification unit 13 estimates the position of each object based on data obtained from the camera 106 or the depth sensor 109. The object identification unit 13 then obtains the positional relationship between each object and the attention region on the display 105 and thereby identifies an object overlapping the attention region as the first object. Note that there is a case where none of the first object is identified. When one or more first objects are identified, the object identification unit 13 acquires a first retrieval key for obtaining the first object information, from each of the first objects. The first retrieval key and a method of acquiring it are not limited. For example, the object identification unit 13 may analyze an image of the camera 106 and thereby convert text or a two-dimensional barcode printed or labeled using a sticker or the like on the first object into a character string, and acquire this character string as the first retrieval key. For example, the first retrieval key may contain the object ID.

In Step S122, the object identification unit 13 identifies an object overlapping the peripheral region as the second object. The object identification unit 13 identifies the second object by obtaining the positional relationship between each object and the peripheral region on the display 105, in the same manner as when identifying the first object. When one or more second objects are identified, the object identification unit 13 acquires a second retrieval key for obtaining the second object information, from each of the second objects, in the same manner as when identifying the first object. The second retrieval key may contain the object ID.

In Step S123, the request unit 14 generates a request signal and transmits this signal to the server 20. The request unit 14 generates a request signal containing the first retrieval key or the second retrieval key. In this processing, the request unit 14 puts those two types of retrieval keys into the request signal in such a way that the server 20 can distinguish between the first retrieval key and the second retrieval key.

In response to this request signal, the server 20 retrieves the object information. In Step S124, the object retrieval unit 23 acquires the first object information from the object database 32 in accordance with the first retrieval key. In Step S125, the object retrieval unit 23 further acquires the second object information from the object database 32 in accordance with the second retrieval key. When the request signal does not contain the first retrieval key, Step S124 is omitted, and when the request signal does not contain the second retrieval key, Step S125 is omitted. In Step S126, the transmitting unit 24 transmits the first object information or the second object information to the HMD 10 as a response to the request signal.

Receiving this response, the FWD 10 receives and displays the object information. In Step S127, the display control unit 16 displays the received first object information or second object information on the display 105. The display control unit 16 displays the first/second object information based on the position of the first/second object on the display 105.

Whether one object A is processed as the first object or the second object or not processed varies depending on the positional relationship between the detected attention region and peripheral region and the object A. In other words, information which the HMD 10 displays in relation to the object A can vary with time, depending on the user's line of sight. An example of processing of acquiring the object information is described hereinafter in detail with reference to FIG. 9, focusing on one object A.

When the object A overlaps the attention region (Yes in Step S131), the object identification unit 13 identifies the object A as the first object in Step S132.

In Step S133, the object identification unit 13 estimates the distance from the user to the object A identified as the first object. The object identification unit 13 obtains the distance from the HMD 10 to the object A by using data obtained from the camera 106 or the depth sensor 109, and uses this distance as the distance from the user to the object A.

When the object A does not overlap the attention region (No in Step S131) and also does not overlap the peripheral region (No in Step S134), the object identification unit 13 does not identify the object A as the first object nor the second object.

On the other when the object A does not overlap the attention region (No in Step S131) and overlaps the peripheral region (Yes in Step S134), the object identification unit 13 determines whether the object A meets a condition for the second object or not in Step S135. Specifically, the object identification unit 13 determines whether to acquire the second object information for the object A. When the object A meets the condition for the second object (Yes in Step S135), the object identification unit 13 identifies the object A as the second object in Step S136. When, on the other hand, the object A does not meet the condition for the second object (No in Step S135), the object identification unit 13 does not identify the object A as the second object.

The condition for the second object is not particularly limited. For example, the condition for the second object may be defined that a contrast between an object and a background region of this object (i.e., the periphery of the object) is equal to or more than a threshold Tc. The object identification unit 13 stores the predetermined threshold Tc in advance. The object identification unit 13 analyzes an image obtained from the camera 106, calculates the contrast between the object A and the background region of the object A, and compares this contrast with the threshold Tc. When the contrast is equal to or more than the threshold Tc (Yes in Step S135), the object identification unit 13 identifies the object A as the second object (Step S136). When, on the other hand, the contrast is less than the threshold Tc (No in Step S135), the object identification unit 13 does not identify the object A as the second object.

The condition for the second object may be defined that an object is moving. The state that "the object is moving" is a concept including both of the state where the position of the object changes and the object moves on site without changing its position. The object identification unit 13 analyzes an image (a video or a series of still images) obtained from the camera 106 and determines whether the object A is moving or not. When the object A is moving (Yes in Step S135), the object identification unit 13 identifies the object A as the second object (Step S136). When, on the other hand, the contrast remains still (No in Step S135), the object identification unit 13 does not identify the object A as the second object.

The condition for the second object may be defined that an object has the same attribute as the first object (i.e., the object overlapping the attention region). For example, the object identification unit 13 analyzes an image of the camera 106 and thereby converts text or a two-dimensional barcode printed or labeled using a sticker or the like on the object A into a character string, and acquires this character string. Further, the object identification unit 13 analyzes this image and thereby converts text or a two-dimensional barcode printed or labeled using a sticker or the like on the already identified first object into a character string, and acquires this character string. Then, the object identification unit 13 compares the both character strings and determines whether the object A has the same attribute as the first object. When the object A has the same attribute as at least one first object (Yes in Step S135), the object identification unit 13 identifies the object A as the second object (Step S136). When, on the other hand, the object A does not have the same attribute as the first object (No in Step S135), the object identification unit 13 does not identify the object A as the second object.

The condition for the second object may be defined that the distance from a user to an object is less than the threshold Ta. The object identification unit 13 stores the predetermined threshold Ta in advance. The object identification unit 13 obtains the distance from the HMD 10 to the object A by using data obtained from the camera 106 or the depth sensor 109 and uses this distance as the distance from the user to the object A. Then, the object identification unit 13 compares this distance with the threshold Ta. When the distance is less than the threshold Ta (Yes in Step S135), the object identification unit 13 identifies the object A as the second object (Step S136). When, on the other hand, the distance is equal to or more than the threshold Ta (No in Step S135), the object identification unit 13 does not identify the object A as the second object.

The condition for the second object may be a combination of the distance from a user to an object and the contrast. In this case, the object identification unit 13 identifies the object A as the second object when the distance is less than the threshold Ta and the contrast is equal to or more than the threshold Tc, and otherwise does not identify the object A as the second object. Alternatively, the condition for the second object may be a combination of the distance and the movement of an object. In this case, the object identification unit 13 identifies the object A as the second object when the distance is less than the threshold Ta and the object A is moving, and otherwise does not identify the object A as the second object. Alternatively, the condition for the second object may be a combination of the distance and the matching of the attribute. In this case, the object identification unit 13 identifies the object A as the second object when the distance is less than the threshold Ta and the object A has the same attribute as at least one first object, and otherwise does not identify the object A as the second object.

After the object A is identified as the first object or the second object, the request unit 14 makes a request for the first or second object information of the object A to the server 20 by generating and transmitting the request signal in Step S137. When the object A is identified as the first object, the request unit 14 generates the request signal indicating a combination of the first retrieval key and the distance from the user, and when the object A is identified as the second object, the request unit 14 generates the request signal containing the second retrieval key. The request unit 14 then transmits the request signal to the server 20.

In Step S138, the receiving unit 15 receives the first object information or the second object information transmitted from the server 20 in response to the request signal.

In Step S139, the display control unit 16 displays the first object information or the second object information on the display 105 in association with the object A.

The process returns to Step S131 after Step S139, and therefore processing of Steps S131 to S139 can be repeated.

When the object A continues to overlap the attention region after the display control unit 16 displays the first object information in Step S139, acquisition and display of the first object information are performed again. To be specific, the request unit 14 makes a request for the first object information to the server 20, the receiving unit 15 receives the first object information from the server 20, and the display control unit 16 display the first object information on the display 105. Thus, in a time period (first time period) where the object A, which is the first object, overlaps the attention region, the request unit 14 makes a request for the first object information related to the object A to the server 20 repeatedly, the receiving unit 15 receives the first object information repeatedly or continuously, and the display control unit 16 displays the first object information on the display 105 repeatedly or continuously. The first object information is requested, received or displayed only during the first time period.

Such repetitive processing is performed also for acquisition and display of the second object information. When the object A continues to overlap the peripheral region after the display control unit 16 displays the second object information in Step S139, acquisition and display of the second object information are performed again. To be specific, the request unit 14 makes a request for the second object information to the server 20, the receiving unit 15 receives the second object information from the server 20, and the display control unit 16 display the second object information on the display 105. Thus, in a time period (third time period) where the object A, which is the second object, overlaps the peripheral region, the request unit 14 makes a request for the second object information related to the object A to the server 20 repeatedly, the receiving unit 15 receives the second object information repeatedly or continuously, and the display control unit 16 displays the second object information on the display 105 repeatedly or continuously.

When the object A is not identified as the first object nor the second object (No in Step S134 or No in Step S135), if the first object information or the second object information is received or displayed, the HMD 10 ends the reception and display in Step S140. When the object information of the object A continues to be received, the receiving unit 15 ends the reception. This means that the receiving unit 15 receives the first object information only during the first time period and receives the second object information only during the third time period. Further, the display control unit 16 erases the first object information or the second object information on the display 105. When the object information is neither received nor displayed at this point of time, processing of Step S140 is omitted.

An example of retrieval of the object information by the server 20 is described in detail hereinafter with reference to FIG. 10. In Step S141, the receiving unit 22 receives the request signal from the HMD 10.

In Step S142, the object retrieval unit 23 sets a retrieved item of the first/second object information for each of the first/second object. For example, the object retrieval unit 23 may set a retrieved item in such a way that the number of data items of the second object information is smaller than the number of data items of the first object information. When acquiring the first object information, the object retrieval unit 23 may change the retrieved item in accordance with the distance between the first object and the user (the HMD 10).

An example of setting of the retrieved item for one object A is described hereinbelow. When the object A is identified as the second object, the object retrieval unit 23 sets a product name as the retrieved item. Assuming that the object A is identified as the first object, when the distance between the object A and the user is equal to or more than a threshold Td, the object retrieval unit 23 sets a product name, a manufacturer name and a price as the retrieved items. Assuming that the object A is identified as the first object, when the distance between the object A and the user is less than the threshold Td, the object retrieval unit 23 sets user's evaluation and comments on the object as the retrieved items. In this example, because the data item of the second object information is only a product name, the number of data items is 1. As for the first object information, the number of data items is 3 when the data item is a product name, a manufacturer name and a price, and the number of data items is 2 when the data item is user's evaluation and comments. The number of data items of the first/second object information is not limited thereto as a matter of course, and the number of data items of the second object information may be 2, and the number of data items of the first object information may be at least 3. Regarding the first object information, at least one data item may be always acquired regardless of the distance, and another data item may or may not be acquired depending on the distance.

In Step S143, the object retrieval unit 23 acquires the first object information or the second object information from the object database 32 in accordance with the set retrieved item. The object retrieval unit 23 retrieves the first object information based on the first retrieval key, and retrieves the second object information based on the second retrieval key.

In Step S144, the transmitting unit 24 transmits the retrieved first object information or second object information to the HMD 10.

FIG. 11 is a view showing an example of display of the object information, which schematically shows an example where the displayed object information varies with a change in a user's visual field. A screen 50 represents at least some of real and virtual objects which a user sees through the display 105 of the HMD 10, and it includes an attention region 51. A region other than the attention region 51 in the screen 50 is a peripheral region. A beer can 61, a magazine 62 and a plate 63 placed on a table are shown as objects.

In this example, the magazine 62 overlaps the attention region 51, and the beer can 61 and the plate 63 overlap the peripheral region. The object identification unit 13 identifies the magazine 62 as the first object, identifies the beer can 61 as the second object, and does not identify the plate 63 as the second object. The object identification unit 13 identifies only the beer can 61 as the second object because the contrast of the beer can 61 is equal to or more than the threshold Tc, whereas the contrast of the plate 63 is less than the threshold Tc, for example. Based on this identification, first object information 621 (product name, manufacturer name and price) of the magazine 62 and second object information 611 (product name) of the beer can 61 are displayed. The data item that forms the first object information 621 is set depending on the distance between the magazine 62 and the user.

It is assumed that the user then moves the line of sight from the magazine 62 to the beer can 61, which makes the visual field change, and thereby the beer can 61 overlaps the attention region 51 and the magazine 62 and the plate 63 overlap the peripheral region. The object identification unit 13 identifies the beer can 61 as the first object, identifies the magazine 62 as the second object, and does not identify the plate 63 as the second object. The object identification unit 13 identifies only the magazine 62 as the second object because the contrast of the magazine 62 is equal to or more than the threshold Te, whereas the contrast of the plate 63 is less than the threshold Tc, for example. Based on this identification, first object information 612 (product name, manufacturer name and price) of the beer can 61 and second object information 622 (product name) of the magazine 62 are displayed. The data item that forms the first object information 612 is set depending on the distance between the beer can 61 and the user.

It is assumed that the user then picks up and looks at the beer can 61, which makes the visual field change, and thereby the distance between the user and the beer can 61 becomes closer while the beer can 61 continues to overlap the attention region 51. While the object identification unit 13 continuously identifies the beer can 61 as the first object, the user's evaluation or comments are displayed as first object information 613 due to a decrease in the distance between the user and the beer can 61. In this manner, it is possible to display basic information of the first object as the first object information when the distance between the first object and the user is comparatively long (when the distance is equal to or more than the threshold Td), and display detailed information of the first object as the first object information when this distance is comparatively short (when the distance is less than the threshold Td).

The HMD 10 may continue to acquire the first object information only during a predetermined period of time even when an object identified as the first object has gone out of the attention region. An example of acquiring the first object information also for the object that has gone out of the attention region is described hereinafter in detail with reference to FIG. 12, focusing on one object A.

This process is different from the process shown in FIG. 9 in processing when the object A does not overlap the attention region (No in Step S131), and FIG. 12 shows this processing in Step S131A. When the object A identified as the first object has gone out of the attention region (the first time period has passed) (No in Step S131), the object identification unit 13 starts measuring an elapsed time from this point of time. In Step S131A, the object identification unit 13 compares the elapsed time with a threshold T (seconds). When T seconds have not elapsed since the object A has gone out of the attention region (when it is in the second time period) (No in Step S131A), the object identification unit 13 executes Steps S132 and S133. Specifically, the object identification unit 13 identifies the object A as the first object, and estimates the distance from the user to the object A. After that, processing of Steps S137 to S139 described above is performed.

On the other hand, when T seconds have elapsed since the object A has gone out of the attention region (when the second time period has passed) (Yes in Step S131A), processing in and after Step S134 described above is performed. In Step S140, when reception of the first object information of the object A continues throughout the first time period and the second time period, the receiving unit 15 ends the reception. This means that the receiving unit 15 receives the first object information only during the first time period and the second time period.

FIG. 13 is a view showing another example of display of the object information, which schematically shows an example of a change in the object information before and after one object is gone out of the attention region. The initial state in FIG. 13 is the same as in FIG. 11, and the first object information 621 (product name, manufacturer name and price) of the magazine 62 and the second object information 611 (product name) of the beer can 61 are displayed on the screen 50.

It is assumed that the user then moves the line of sight from the magazine 62 to the beer can 61, which makes the visual field change, and thereby the beer can 61 overlaps the attention region 51 and the magazine 62 and the plate 63 overlap the peripheral region. When a time during which the magazine 62 is out of the attention region 51 is less than the threshold T (seconds), the object identification unit 13 identifies the beer can 61 overlapping the attention region 51 as the first object, and continuously identifies the magazine 62 overlapping the peripheral region as the first object. Based on this identification, the first object information 612 (product name, manufacturer name and price) of the beer can 61 is displayed and also the first object information 621 (product name, manufacturer name and price) of the magazine 62 is continuously displayed. The data item that forms the first object information is set depending on the distance between the object and the user.

After that, when a time during which the magazine 62 is out of the attention region 51 becomes equal to or more than the threshold T (seconds), the object identification unit 13 identifies the magazine 62 overlapping the peripheral region 51 as the second object. Based on this identification, the second object information 622 (product name) of the magazine 62 is displayed. Specifically, when T seconds have elapsed since the magazine 62 has moved from the attention region 51 to the peripheral region, the object information of the magazine 62 changes from the first object information 621 to the second object information 622.

The HMD 10 may continue to receive and display the first object information without repeating a request for the first object information during a period when an object identified as the first object keeps overlapping the attention region. Specifically, a request for the first object information may be made only once at the point of time when an object that has been located outside the attention region comes to overlap the attention region. Likewise, the HMD 10 may continue to receive and display the second object information without repeating a request for the second object information during a period when an object identified as the second object keeps overlapping the peripheral region. Specifically, a request for the second object information may be made only once at the point of time when an object that has been located outside the peripheral region comes to overlap the peripheral region. An example of processing of continuing reception and display while a request is made only once is described hereinafter in detail with reference to FIG. 14, focusing on one object A.

This process is different from the process shown in FIG. 9 in that processing of determining whether or not to request object information is added, and this processing is shown in Steps S133A and S136A in FIG. 14. Further, Step S137 in FIG. 9 is divided into Steps S137A and 137B in FIG. 14.

In Steps S132 and S133, it is assumed that the object identification unit 13 identifies the object A as the first object and estimates the distance from the user to the object A. In this case, in Step S133A, the request unit 14 determines whether to make a request for the first object information to the server 20.

When the request signal is not yet transmitted after the object A comes to overlap the attention region, the request unit 14 determines to request the first object information (Yes in Step S133A). Even when the request signal is already transmitted, the request unit 14 may determine to request the object information if a change in the distance from the user to the object A is equal to or more than a threshold Tx (Yes in Step S133A). In Step S137A, the request unit 14 makes a request for the first object information of the object A to the server 20 by generating and transmitting the request signal. In this case, processing of Steps S138 and S139 is performed.

On the other hand, when the request signal is already transmitted after the object A comes to overlap the attention region, the request unit 14 determines not to request the object information (No in. Step S133A) and omits processing of Step S137A. The request unit 14 may determine not to request the object information (No in Step S133A) and omits processing of Step S137A when the request signal is already transmitted and the distance from the user to the object A is less than the threshold Tx. In the case where Step S137A is omitted, there is a case where the receiving unit 15 continuously receives the first object information (Step S138). Processing of Step S139 is the same as processing shown in FIG. 9

In Steps S136, it is assumed that the object identification unit 13 identifies the object A as the second object. In this case, in Step S136A, the request unit 14 determines whether to make a request for the second object information to the server 20.

When the request signal is not yet transmitted after the object A comes to overlap the peripheral region, the request unit 14 determines to request the second object information (Yes in Step S136A). In Step S137B, the request unit 14 makes a request for the second object information of the object A to the server 20 by generating and transmitting the request signal. In this case, processing of Steps S138 and S139 is performed.

On the other hand, when the request signal is already transmitted after the object A comes to overlap the peripheral region, the request unit 14 determines not to request the object information (No in Step S136A) and omits processing of Step S137B. In the case where Step S137B is omitted, there is a case where the receiving unit 15 continuously receives the second object information (Step S138). Processing of Step S139 is the same as processing shown in FIG. 9

The HMD 10 may continue to receive and display the first object information without generating and transmitting the request signal again when it continues to acquire the first object information only during a predetermined period of time after the object identified as the first object has gone out of the attention region. Thus, the process shown in FIG. 14 may be combined with the process shown in FIG. 12.

Figure 15:
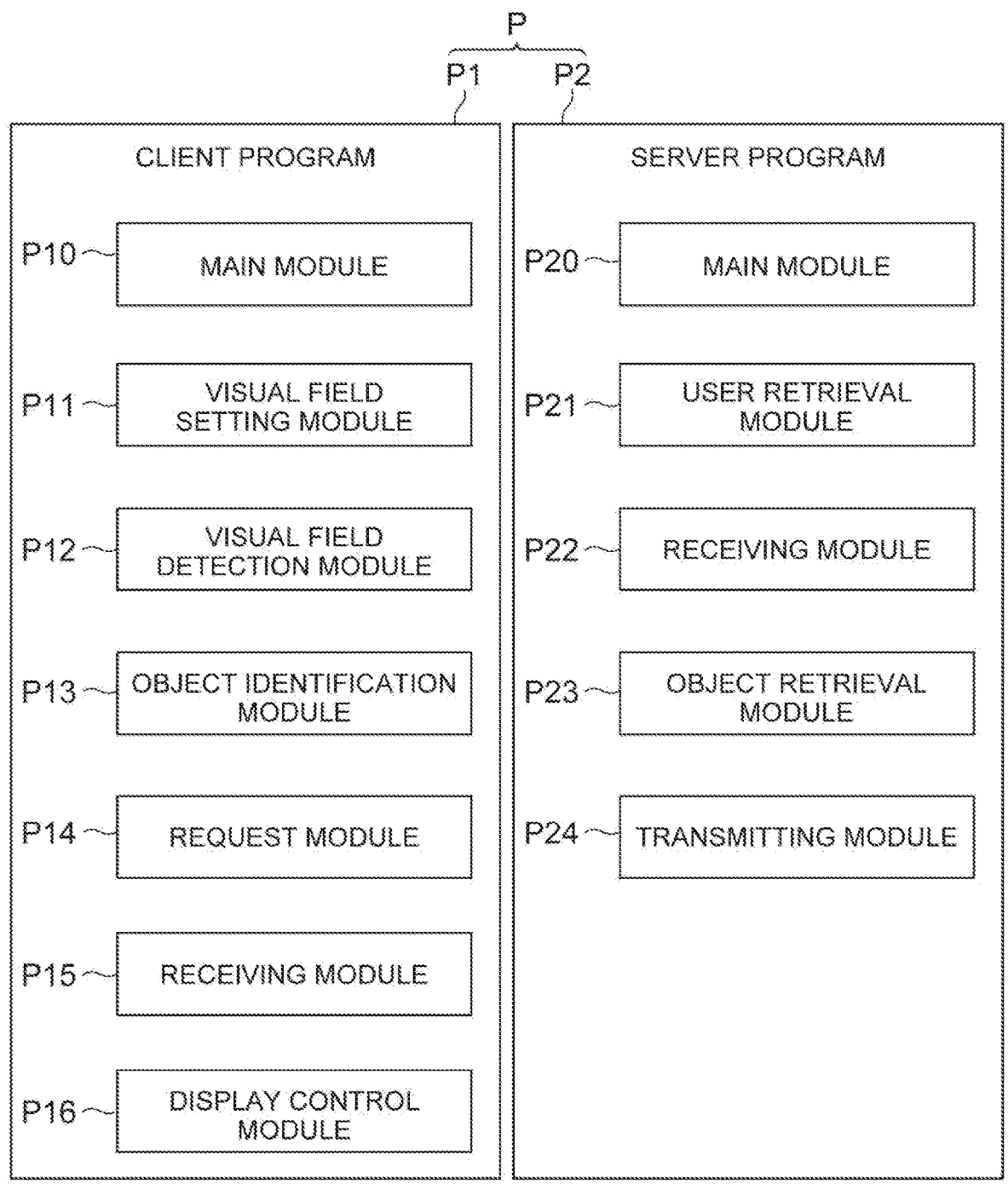
FIG. 15 is a view showing the configuration of an information processing program according to the embodiment.

[Program] An augmented reality (AR) program P that causes a computer system to function as the AR system 1 is described hereinafter with reference to FIG. 15. FIG. 15 is a view showing the configuration of the AR program P. The AR program P includes a client program P1 that causes a computer to function as the HMD 10 and a server program P2 that causes a computer to function as the server 20. In this embodiment, an information processing program according to the present invention is applied to the client program P1.

The client program P1 includes a main module P10, a visual field setting module P11, a visual field detection module P12, an object identification module P13, a request module P14, a receiving module P15, and a display control module P16. The main module P10 is a part that exercises control over the functions of the HMD 10. The visual field setting unit 11, the visual field detection unit 12, the object identification unit 13, the request unit 14, the receiving unit 15 and the display control unit 16 are implemented by executing the visual field setting module P11, the visual field detection module P12, the object identification module P13, the request module P14, the receiving module P15 and the display control module P16, respectively.

The server program P2 includes a main module P20, a user retrieval module P21, a receiving module P22, an object retrieval module P23, and a transmitting module P24. The main module P20 is a part that exercises control over the functions of the server 20. The user retrieval unit 21, the receiving unit 22, the object retrieval unit 23 and the transmitting unit 24 are implemented by executing the user retrieval module P21, the receiving module P22, the object retrieval module P23 and the transmitting module P24, respectively.

Each of the client program P1 and the server program P2 may be provided in the form of being recorded in a static manner on a tangible recording medium such as CD-ROM, DVD-ROM or semiconductor memory, for example. Alternatively, each of the client program P1 and the server program P2 may be provided as a data signal superimposed onto a carrier wave through a communication network. The client program P1 and the server program P2 may be provided together or separately.

[Advantageous Effects] As described above, an information processing device according to one aspect of the present invention includes a detection unit configured to detect an attention region corresponding to a user's sense of sight, an identification unit configured to identify a first object overlapping the attention region from one or more objects existing in a space where the user is located, a request unit configured to make a request for first object information related to the first object to another computer during a first time period where the first object overlaps the attention region, and a receiving unit configured to receive the first object information transmitted from the another computer in response to the request during the first time period.

An information processing method according to one aspect of the present invention is an information processing method performed by an information processing device including a processor, the method including a detection step of detecting an attention region corresponding to a user's sense of sight, an identifying step of identifying a first object overlapping the attention region from one or more objects existing in a space where the user is located, a request step of making a request for first object information related to the first object to another computer during a first time period where the first object overlaps the attention region, and a receiving step of receiving the first object information transmitted from the another computer in response to the request during the first time period.

An information processing program according to one aspect of the present invention causes a computer to execute a detection step of detecting an attention region corresponding to a user's sense of sight, an identifying step of identifying a first object overlapping the attention region from one or more objects existing in a space where the user is located, a request step of making a request for first object information related to the first object to another computer during a first time period where the first object overlaps the attention region, and a receiving step of receiving the first object information transmitted from the another computer in response to the request during the first time period.

In the above-described aspects, during the first time period where an object overlaps the attention region, request and reception of the first object information related to this object are performed. Because a user is likely to be paying attention to this object during this first time period, information of the first object that is provided through a communication network is useful to a user and does not result in waste. In this manner, by requesting and receiving information during a time period where a user is likely to be paying attention to an object, it is possible to efficiently perform data communication of an information processing device. This means that it is possible to reduce loads on a communication network.

In an information processing device according to another aspect, the request unit may repeatedly make a request for the first object information to the another computer during the first time period. By repeatedly requesting and receiving information during a time period where a user is likely to be paying attention to an object, it is possible to efficiently perform data communication of an information processing device.

In an information processing device according to another aspect, the receiving unit may continuously receive the first object information during the first time period. By continuously receiving information during a time period where a user is likely to be paying attention to an object, it is possible to efficiently perform data communication of an information processing device.

In an information processing device according to another aspect, the identification unit may estimate a distance between the first object and the user, the request unit may request the first object information containing a data item in accordance with the distance, and the receiving unit may receive the first object information containing the data item in accordance with the distance. It is likely that, as the distance between an object and a user is closer, the user is more strongly interested in this object. Thus, by setting the content of the first object information in accordance with the distance, it is possible to provide information desired by a user without performing useless data communication.

In an information processing device according to another aspect, the request unit may request the first object information only during the first time period, and the receiving unit may receive the first object information only during the first time period. By providing the first object information only during a time period where a user is likely to be paying attention to an object, it is possible to make sure to avoid useless data communication.

In an information processing device according to another aspect, the request unit may make a request for the first object information related to the first object to another computer also during a second time period until an identified time has elapsed since the first object has gone out of the attention region, and the receiving unit may receive the first object information transmitted from the another computer in response to the request also during the second time period. By considering the possibility that the user's line of sight moves back to its original position in a short time and acquiring the first object information during this short period of time even when the first object has gone out of the attention region, it is possible to avoid frequent change of displayed information and continuously display the same information.

In an information processing device according to another aspect, the request unit may request the first object information only during the first time period and the second time period, and the receiving unit may receive the first object information only during the first time period and the second time period. By providing the first object information only during a time period where a user is likely to be paying attention to an object and a time period where the user's line of sight is likely to move back to its original position, it is possible to make sure to avoid useless data communication.

In an information processing device according to another aspect, the detection unit may further detect a peripheral region outside the attention region, the identification unit may identify a second object overlapping the peripheral region from the one or more objects, the request unit may make a request for second object information related to the second object to the another computer during a third time period where the second object overlaps the peripheral region, and the receiving unit may receive the second object information transmitted from the another computer in response to the request during the third time period. Because there is a possibility that a user focuses attention on an object located in the peripheral region of the visual field, information of the second object that is provided through a communication network can be also useful to the user. Thus, by providing information of the second object located in the peripheral region, it is possible to provide the user with information likely to be needed, avoiding useless data communication.

In an information processing device according to another aspect, the request unit may repeatedly make a request for the second object information to the another computer during the third time period. By repeatedly requesting information of the second object, it is possible to repeatedly provide a user with information likely to be needed, avoiding useless data communication.

In an information processing device according to another aspect, the number of data items of the second object information may be smaller than the number of data items of the first object information. In general, a user clearly recognizes and has a strong interest in an object in the attention region rather than an object in the peripheral region. Therefore, by setting the number of data items of the second object related to an object in the peripheral region to be smaller than the number of data items of the first object information, it is possible to suppress the amount of data of the second object information and reduce loads on the communication network.

In an information processing device according to another aspect, the identification unit may identify, as the second object, the object whose distance from the user is less than a threshold among one or more objects overlapping the peripheral region. For the second object overlapping the peripheral region, human generally has a stronger interest in the object that is closer to them. Therefore, by acquiring the second object information only for the second object located closer to a user, it is possible to suppress the amount of data of the second object information and reduce loads on the communication network.

In an information processing device according to another aspect, the identification unit may identify, as the second object, the object whose contrast from a background region is equal to or more than a threshold among one or more objects overlapping the peripheral region. For the second object overlapping the peripheral region, human generally more easily identifies the object with high contrast. Therefore, by acquiring the second object information only for the second object with high contrast, it is possible to suppress the amount of data of the second object information and reduce loads on the communication network.

In an information processing device according to another aspect, the identification unit may identify, as the second object, the moving object among one or more objects overlapping the peripheral region. For the second object overlapping the peripheral region, human generally more easily identifies the moving object. Therefore, by acquiring the second object information only for the moving second object, it is possible to suppress the amount of data of the second object information and reduce loads on the communication network.

In an information processing device according to another aspect, the identification unit may identify, as the second object, the object having the same attribute as the first object among one or more objects overlapping the peripheral region. For the second object overlapping the peripheral region, a user is likely to pay attention to the object having the same attribute as the first object which the user is currently paying attention to. Therefore, by acquiring the second object information only for the second object having the same attribute as the first object, it is possible to suppress the amount of data of the second object information and reduce loads on the communication network.

An information processing device according to another aspect may further include a setting unit configured to set the attention region based on the user attribute. By setting the attention region for each user, the amount of the first object information needed for each user is requested and received. It is thereby possible to efficiently perform data communication of an information processing device.

In an information processing device according to another aspect, the setting unit may set the attention region based on the user's moving speed. The human visual field tends to become narrower as the moving speed is higher, and the central vision and the effective visual field where human can clearly recognize an object also become narrower. Therefore, by setting the attention region based on the user's moving speed, the amount of the first object information needed for the user is requested and received. It is thereby possible to efficiently perform data communication of an information processing device.

An information processing device according to another aspect may further include a display control unit configured to display the first object information on a display during the first time period.

In an information processing device according to another aspect, the display may be a head-mounted display.

In the above-described aspects, it is possible to let a user see the first object information through a display such as the head-mounted display during the first time period where the user is likely to be paying attention to the object. By displaying information during a time period where a user is likely to be paying attention to an object, it is possible to efficiently control the display.

An embodiment of the present invention is described in detail above. However, the present invention is not limited to the above-described embodiment. Various changes and modifications may be made to the present invention without departing from the scope of the invention.

The receiving unit may receive the first object information or the second object information by using resume download feature. The resume download feature is a function that, even when download is suspended, resumes download from the suspended part.

Although the HMD 10 displays the first object information or the second object information on the display 105 in the above-described embodiment, application of the requested and received object information is not limited to displaying. For example, the information processing device may store the requested and received first object information or second object information into a memory or transmit it to another information processing device.

Although the HMD 10 detects both of the attention region and the peripheral region in the above-described embodiment, detection of the peripheral region is not essential processing of the information processing device. Thus, the information processing device does not need to perform processing related to the second object.

Although the HMD 10 is described by way of illustration in the above-described embodiment, the configuration of the information processing device is not limited. For example, the information processing device may be a combination of a wearable terminal such as the HMD and another terminal such as an advanced mobile phone (smartphone).

The procedure of the information processing method that is performed by at least one processor is not limited to the example shown in the above-described embodiment. For example, some of the above-described steps (processing) may be skipped, or the steps may be performed in a different order. Further, any two or more steps of the above-described steps may be combined, or some of the steps may be modified or eliminated. Alternatively, another step may be performed in addition to the above-described steps.

When comparing two numerical values in a computer system including the information processing device according to the present invention, any of the two criteria "equal to or more than" and "more than" may be used, and any of the two criteria "equal to or less than" and "less than" may be used. Selection of the criteria would not change the technical significance regarding the processing of comparing two numerical values.

REFERENCE SIGNS LIST

1 . . . augmented reality system, 10 . . . head-mounted display (information processing device), 11 . . . visual field setting unit, 12 . . . visual field detection unit, 13 . . . object identification unit, 14 . . . request unit, 15 . . . receiving unit, 16 . . . display control unit, 20 . . . server, 21 . . . user retrieval unit, 22 . . . receiving unit, 23 . . . object retrieval unit, 24 . . . transmitting unit, 30 . . . databases, 31 . . . user database, 32 . . . object database, P . . . augmented reality program (information processing program) , P1 . . . client program, P10 . . . main module, P11 . . . visual field setting module, P12 . . . visual field detection module, P13 . . . object identification module, P14 . . . request module, P15 . . . receiving module, P16 . . . display control module, P2 . . . server program, P20 . . . main module, P21 . . . user retrieval module, P22 . . . receiving module, P23 . . . object retrieval module, P24 . . . transmitting module.

The invention claimed is:

1. An information processing device comprising:
at least one memory operable to store program code; and
at least one processor operable to read the program code and operate as instructed by the program code, the program code being configured to cause the at least one processor to:
detect an attention region corresponding to a user's sense of sight;
identify a first object overlapping the attention region from one or more objects existing in a space where the user is located;
make a request for first object information related to the first object to another computer during a first time period where the first object overlaps the attention region; and
receive the first object information transmitted from the another computer in response to the request during the first time period,
make a request for the first object information related to the first object to another computer also during a second time period until an identified time has elapsed since the first object has gone out of the attention region; and receive the first object information transmitted from the another computer in response to the request also during the second time period, wherein the information processing device is a device to be worn on the user's head.

2. The information processing device according to claim 1, wherein
the program code is further configured to cause the at least one processor to repeatedly make a request for the first object information to the another computer during the first time period.

3. The information processing device according to claim 1, wherein
the program code is further configured to cause the at least one processor to continuously receive the first object information during the first time period.

4. The information processing device according claim 1, wherein
the program code is further configured to cause the at least one processor to:
estimate a distance between the first object and the user;
request the first object information containing a data item in accordance with the distance; and
receive the first object information containing the data item in accordance with the distance.

5. The information processing device according to claim 1, wherein
the program code is further configured to cause the at least one processor to:
request the first object information only during the first time period; and
receive the first object information only during the first time period.

6. The information processing device according to claim 1, wherein
the program code is further configured to cause the at least one processor to:
request the first object information only during the first time period and the second time period; and
receive the first object information only during the first time period and the second time period.

7. The information processing device according claim 1, wherein
the program code is further configured to cause the at least one processor to:
detect a peripheral region outside the attention region;
identify a second object overlapping the peripheral region from the one or more objects;
make a request for second object information related to the second object to the another computer during a third time period where the second object overlaps the peripheral region; and
receive the second object information transmitted from the another computer in response to the request during the third time period.

8. The information processing device according to claim 7, wherein
the program code is further configured to cause the at least one processor to repeatedly make a request for the second object information to the another computer during the third time period.

9. The information processing device according to claim 7, wherein
the number of data items of the second object information is smaller than the number of data items of the first object information.

10. The information processing device according claim 7, wherein
the program code is further configured to cause the at least one processor to identify, as the second object, the object whose distance from the user is less than a threshold among one or more objects overlapping the peripheral region.

11. The information processing device according claim 7, wherein
the program code is further configured to cause the at least one processor to identify, as the second object, the object whose contrast from a background region is equal to or more than a threshold among one or more objects overlapping the peripheral region.

12. The information processing device according to claim 7, wherein
the program code is further configured to cause the at least one processor to identify, as the second object, the moving object among one or more objects overlapping the peripheral region.

13. The information processing device according claim 7, wherein
program code is further configured to cause the at least one processor to identify, as the second object, the object having the same attribute as the first object among one or more objects overlapping the peripheral region.

14. The information processing device according to claim 1, wherein
the program code is further configured to cause the at least one processor to set the attention region based on the user attribute.

15. The information processing device according to claim 14, wherein
the program code is further configured to cause the at least one processor to set the attention region based on the user's moving speed.

16. The information processing device according claim 1, wherein
the program code is further configured to cause the at least one processor to display the first object information on a display during the first time period.

17. The information processing device according to claim 16, wherein the display is a head-mounted display.

18. An information processing method performed by an information processing device including a processor, the method comprising:
detecting an attention region corresponding to a user's sense of sight;
identifying a first object overlapping the attention region from one or more objects existing in a space where the user is located;
making a request for first object information related to the first object to another computer during a first time period where the first object overlaps the attention region; and
receiving the first object information transmitted from the another computer in response to the request during the first time period,
make a request for the first object information related to the first object to another computer also during a second time period until an identified time has elapsed since the first object has gone out of the attention region; and
receive the first object information transmitted from the another computer in response to the request also during the second time period, wherein the information processing device is a device to be worn on the user's head.

19. A non-transitory recording medium storing an information processing program causing a computer to:
- detect an attention region corresponding to a user's sense of sight;
- identify a first object overlapping the attention region from one or more objects existing in a space where the user is located;
- make a request for first object information related to the first object to another computer during a first time period where the first object overlaps the attention region; and
- receive the first object information transmitted from the another computer in response to the request during the first time period,
- make a request for the first object information related to the first obj ect to another computer also during a second time period until an identified time has elapsed since the first object has gone out of the attention region; and
- receive the first object information transmitted from the another computer in response to the request also during the second time period,
- wherein the computer is a device to be worn on the user's head.

* * * * *